(12) United States Patent
Oguchi et al.

(10) Patent No.: US 7,593,337 B2
(45) Date of Patent: Sep. 22, 2009

(54) PACKET PROCESSING SYSTEM

(75) Inventors: Naoki Oguchi, Kawasaki (JP); Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 941 days.

(21) Appl. No.: 10/769,752

(22) Filed: Feb. 3, 2004

(65) Prior Publication Data

US 2004/0170133 A1     Sep. 2, 2004

(30) Foreign Application Priority Data

Feb. 28, 2003   (JP)   ............................. 2003-054410
May 21, 2003    (JP)   ............................. 2003-144137

(51) Int. Cl.
    *H04L 1/00* (2006.01)
(52) U.S. Cl. .................. 370/235; 370/230; 370/231; 370/244; 370/401
(58) Field of Classification Search ................ 709/220, 709/224; 370/369, 392, 230, 231, 244, 401; 713/151
    See application file for complete search history.

(56) References Cited

U.S. PATENT DOCUMENTS

| | | | | |
|---|---|---|---|---|
| 5,867,666 A * | 2/1999 | Harvey | ........................ | 709/239 |
| 5,970,066 A * | 10/1999 | Lowry et al. | ................. | 370/353 |
| 6,879,587 B1 * | 4/2005 | Yadav et al. | ................. | 370/389 |
| 6,970,943 B1 * | 11/2005 | Subramanian et al. | ...... | 709/238 |
| 7,003,574 B1 * | 2/2006 | Bahl | .......................... | 709/228 |
| 7,203,740 B1 * | 4/2007 | Putzolu et al. | .............. | 709/220 |
| 7,281,038 B1 * | 10/2007 | Salkewicz | ................... | 709/223 |
| 2002/0143953 A1 * | 10/2002 | Aiken, Jr. | ................... | 709/227 |
| 2007/0033413 A1 * | 2/2007 | Terrell et al. | ................ | 713/183 |

FOREIGN PATENT DOCUMENTS

| JP | 6-66813 B | 8/1994 |
|---|---|---|
| JP | 2000-134214 A | 5/2000 |

OTHER PUBLICATIONS

Yang et al.; "Forwarding and Control Element Seperation (ForCES) Framework" Dec. 2002; IETF; pp. 2-24.*
Biswas et al.; "The IEEE P1520 Standards Initaive fro Programmable Network Interfaces"; 1998; IEEE; pp. 65-69.*
Goren, "P1520 reference model", Jan. 18-19, 1999.
Kamitani et al., "Serial" Essence of Load Balancer (1), F5 Networks, Feb. 5, 2003, pp. 1/8-8/8.
Kawasaki et al., "The Method of High-Speed and Flexible Forwarding with Information Processing Technology", The Institute of Electronics, Information and Communication Engineers, Mar. 19, 2003.
Oguchi, "A Method of Increasing Speed and Performance of a Router through Coordination with a Server", Japan Society for the Promotion of Science, University-Industry Cooperative Research Committee, JSPS 163rd Committee on Internet Technology, May 22, 2003.

* cited by examiner

*Primary Examiner*—Ricky Ngo
*Assistant Examiner*—Dewanda Samuel
(74) *Attorney, Agent, or Firm*—Staas & Halsey LLP

(57) ABSTRACT

A control device includes a virtual IF set to associate with address information of an interface on a forwarding device and, when detecting that an application section accesses the virtual IF, requests the forwarding device to set a packet transfer rule for transferring a packet received on an interface to the control device while making the packet associate with the virtual IF. The forwarding device sets the packet transfer rule requested by the control device.

36 Claims, 25 Drawing Sheets

FIG.2

| CONTROL DEVICE ADDRESS | 192.168.250.3 |
|---|---|
| VIRTUAL IF | veth1 |
| ACTUAL IF | eth1 |

FIG.3

| REPEATER ADDRESS | 192.168.240.1 |
|---|---|
| VIRTUAL IF | veth1 |
| ACTUAL IF | eth1 |
| DOWN TUNNEL ID | 250 |

FIG.4

| CONTROL DEVICE ADDRESS | 192.168.250.3 |
|---|---|
| PROTOCOL ADDRESS | 80 |
| VIRTUAL IF | veth1 |
| UP TUNNEL ID | 150 |

FIG.5

| UP TUNNEL ID | RECEPTION VIRTUAL IF |
|---|---|
| 150 | veth1 |

FIG.6

| TRANSMISSION VIRTUAL IF | DOWN TUNNEL ID | FORWARDING DEVICE ADDRESS |
|---|---|---|
| veth1 | 250 | 192.168.240.1 |

FIG.7

| RECEPTION IF | PORT NUMBER OF DESTINATION TCP/UDP | UP TUNNEL ID | DESTINATION CONTROL DEVICE ADDRESS |
|---|---|---|---|
| eth1 | 80 | 150 | 192.168.250.3 |

FIG.8

| DOWN TUNNEL ID | TRANSMISSION IF |
|---|---|
| 250 | eth1 |

FIG.14

| DESTINATION IP ADDRESS | PORT NUMBER OF DESTINATION TCP/ UDP | VIRTUAL IP ADDRESS |
|---|---|---|
| 192.168.250.3 | 80 | 10.20.30.100 |

FIG.15

| VIRTUAL IP ADDRESS | SENDER IP ADDRESS |
|---|---|
| 10.20.30.100 | 192.168.250.3 |

FIG.16

| PORT NUMBER OF DESTINATION TCP/UDP | TRANSFER DESTINATION CONTROL DEVICE ADDRESS |
|---|---|
| 80 | 192.168.250.3 |

FIG.17

| SENDER IP ADDRESS | VIRTUAL IP ADDRESS |
|---|---|
| 192.168.250.3 | 10.25.30.100 |

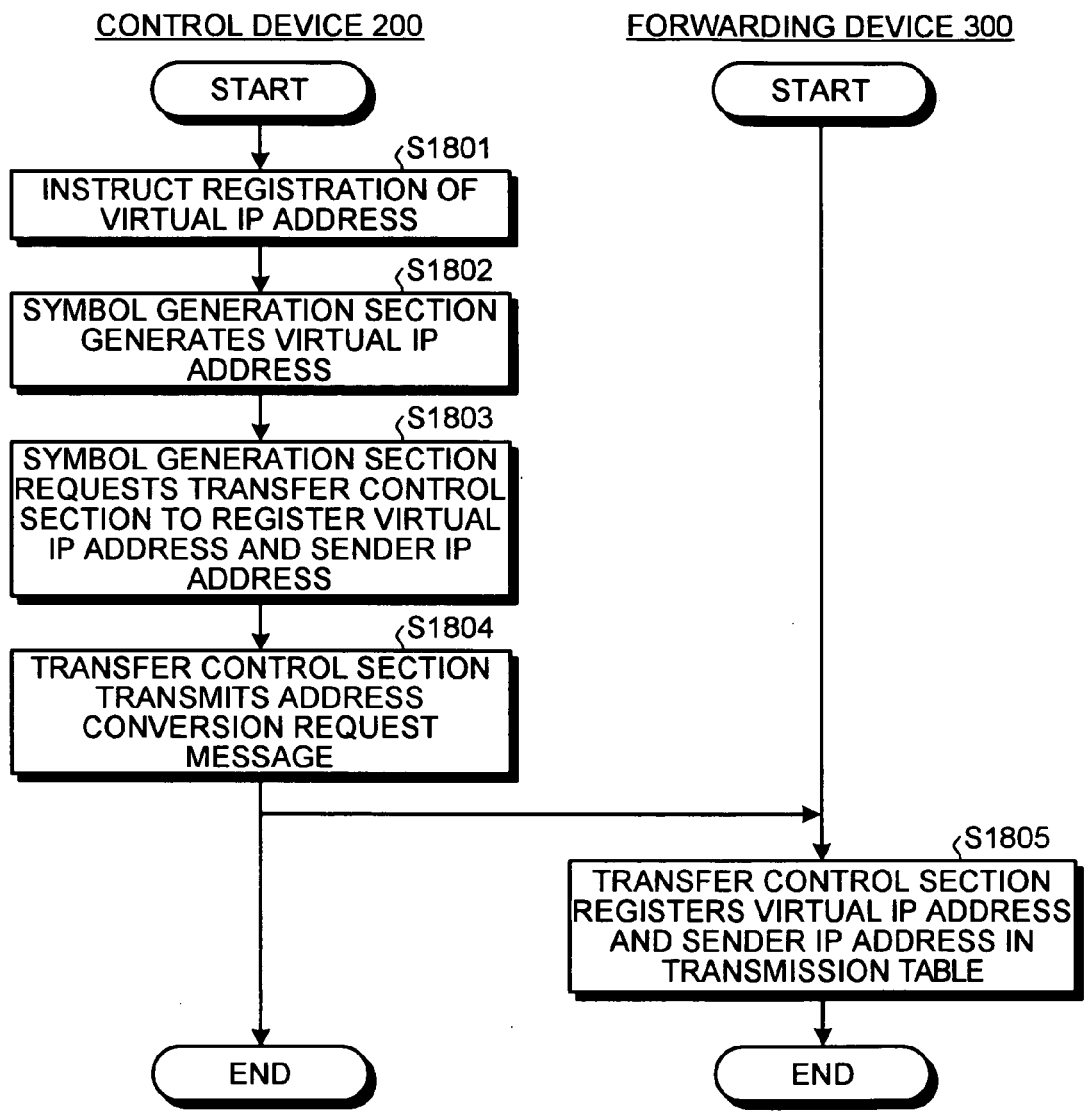

FIG.21

| | |
|---|---|
| CONTROL DEVICE ADDRESS | 192.168.250.3 |
| PORT NUMBER OF DESTINATION TCP/UDP | 80 |
| VIRTUAL IP ADDRESS | 10.25.30.100 |
| RECEPTION IP ADDRESS | 192.168.250.3 |

PACKET PROCESSING SYSTEM

BACKGROUND OF THE INVENTION

1) Field of the Invention

The present invention relates to a packet processing system separated from or integrated with a forwarding device and a control device. More specifically, the present invention relates to a packet processing system which enables a control device to dynamically set a packet transfer rule between the control device and a forwarding device even if a new application is started on the control device and which can thereby separate and integrate the forwarding device and the control device without modifying a conventionally used application.

2) Description of the Related Art

Recently, as the development of the Internet progresses, networks have become large in size and accelerated and service requirements have diversified. Accordingly, demand for a control processing ability of a communication device that constitutes each network and for information processing resources such as a necessary memory is rapidly increasing. In these circumstances, many trial have been taken to separate the communication device into a forwarding device and a control device, to provide the control device that satisfies the rapidly increasing demand for the information processing resources, and integrate the network.

For example, P1520 Reference Model [Gilad Goren] (doc), Documents, Foils and Minutes of the Fifth WG Meeting, held in Princeton (Jan. 18 to 19, 1999), which was obtained on http://www.ieee-pin.org/ by Internet search on Apr. 16, 2003, discloses a first conventional art which has been studied by the IEEE P1520WG for definitions of forwarding device and a control device and prescriptions of an interface (hereinafter, "IF") between them regarding to a communication device that constitutes a network in order to provide an integrated network. Serial forum, "Master of IP Network", Hajime KAMITANI, Toru IMANO, which was obtained on http://www.atmarkit.co.ip/fnetwork/rensai/index/index-serial.html#1b/ by Internet search on Mar. 20, 2003, discloses a second conventional art for distributing a service request to an appropriate control device based on a packet transfer protocol between a preset forwarding device and a control device if the forwarding device receives the service request to a virtual control device on the forwarding device from a network node.

However, the first conventional art has the following disadvantage. In the first conventional art, with a view of providing the integrated network, the definition of the forwarding function and the control function and the prescription of the IF between them regarding to the communication device that constitutes the network are considered. Nevertheless, the disadvantage which arises to the network and which arises when the forwarder function and the control function of the communication device that constitutes the network are separated is not overcome yet.

For example, according to the second conventional art, if the forwarding device receives the service request to the virtual control device on the forwarding device from the network node, the service request can be distributed to an optimum control device based on the preset packet transfer protocol between the forwarding device and the control device. However, if a new application is started on the control device, the packet transfer rule between the control device and the forwarding device cannot be dynamically set. As a result, it is disadvantageously necessary to modify the conventionally used application or manually set the packet transfer rule.

SUMMARY OF THE INVENTION

It is an object of the present invention to at least solve the problems in the conventional technology.

A packet processing system according to one aspect of the present invention includes a forwarding device that transmits and receives a packet through a network interface; and a control device that responds to the packet using an application and transfers the packet between the control device and the forwarding device. The control device includes a symbol section that is associated with address information of the forwarding device; and a first transfer control section that when detecting that the application accesses the symbol section, transmits to the forwarding device a request to make the forwarding device set a packet transfer rule that is used to transfer the received packet to the control device. The forwarding device includes a second transfer control section that sets the packet transfer rule in response to the setting request.

A packet processing system according to another aspect of the present invention performs communication with a network node through a network interface of a forwarding device. The network interface of the forwarding device and a process on a control device are connected to each other by an internal communication path. The control device includes a symbol setting unit, a first downstream path generation unit, a destination determination unit, and a first upstream path generation unit. The symbol setting unit sets and associates a symbol section that communicates with the process on the control device with an interface of the forwarding device. The first downstream path generation unit receives from the forwarding device a downstream internal communication path identifier of a downstream internal communication path on which data is transferred in a direction from the symbol section to the interface of the forwarding device, and generates a first downstream path table where the downstream internal path identifier is associated with the symbol section and an address of the forwarding device. The destination determination unit receives an open message that enable the process to begin communication with the symbol section, and transmits an internal communication path message by which an upstream internal communication path on which data packet is transferred in a direction from the interface of the forwarding device to the symbol section is generated. The first upstream path generation unit receives the internal communication path message, transmits an input-output port identifier of the process and an upstream internal communication path identifier to the forwarding device, and generates a first upstream path table where the upstream internal path identifier is associated with the symbol section and the input-output port identifier. The forwarding device includes a second downstream path generation unit that generates a second downstream path table where the downstream internal path identifier is associated with the interface of the forwarding device; and a second upstream path generation unit that generates a second upstream path table where the input-output port identifier of the process, the upstream internal communication path identifier, and the interface on the forwarding device are associated with each other.

A method according to still another aspect of the present invention is a method of processing a packet between a forwarding device and a control device. The forwarding device transmits and receives the packet through a network interface, and the control device responds to the packet using an application. The method includes associating a symbol section with address information of the forwarding device; transmitting from the control device to the forwarding device a request that make the forwarding device set a packet transfer rule that is used to transfer the received packet to the control device, when the control device detects that the application accesses the symbol section; setting the packet transfer rule in the control device; and setting the packet transfer rule in response to the setting request in the forwarding device.

A method according to still another aspect of the present invention is a method of processing a packet in communication with other network nodes through a network interface of a forwarding device. The network interface of the forwarding device and a process on a control device are connected to each other by an internal communication path. The method includes setting and associating a symbol section that communicates with the process on the control device with an interface of the forwarding device; receiving from the forwarding device a downstream internal communication path identifier of a downstream internal communication path on which data is transferred in a direction from the symbol section to the interface of the forwarding device, in the control device; generating a first downstream path table where the downstream internal path identifier is associated with the symbol section and an address of the forwarding device; receiving an open message that the process starts communicating with the symbol section, in the control device; transmitting an internal communication path message by which an upstream internal communication path on which data is transferred in a direction from the interface of the forwarding device to the symbol section is generated; receiving the internal communication path message in the control device; transmitting from to the control device to the forwarding device an input-output port identifier of the process and an upstream internal communication path identifier; generating a first upstream path table where the upstream internal path identifier is associated with the symbol section and the input-output port identifier. The method also includes generating a second downstream path table where the downstream internal path identifier is associated with the interface of the forwarding device; and generating a second upstream path table where the input-output port identifier of the process, the upstream internal communication path identifier, and the interface are associated with each other.

The computer program product according to still another aspect of the present invention realizes the method according to the present invention on a computer.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 2 illustrates one example of a tunnel generation request message in the packet processing system shown in FIG. 1;

FIG. 3 illustrates one example of the tunnel generation response message in the packet processing system shown in FIG. 1;

FIG. 4 illustrates one example of a transfer request message in the packet processing system shown in FIG. 1;

FIG. 5 illustrates one example of a reception table of a control device in the packet processing system shown in FIG. 1;

FIG. 6 illustrates one example of a transmission table of the control device in the packet processing system shown in FIG. 1;

FIG. 7 illustrates one example of a distribution table of a forwarding device in the packet processing system shown in FIG. 1;

FIG. 8 illustrates one example of a reception table of the forwarding device in the packet processing system shown in FIG. 1;

FIG. 14 illustrates one example of a reception table of a control device in the packet processing system shown in FIG. 13;

FIG. 15 illustrates one example of a transmission table of the control device in the packet processing system shown in FIG. 13;

FIG. 16 illustrates one example of a distribution table of a forwarding device in the packet processing system shown in FIG. 13;

FIG. 17 illustrates one example of a reception table of the forwarding device in the packet processing system shown in FIG. 13;

FIG. 18 is a flow chart which illustrates virtual IP address registration procedures in the packet processing system shown in FIG. 13;

FIG. 19 illustrates one example of an address conversion request message in the packet processing system shown in FIG. 13;

FIG. 21 illustrates one example of a transfer request message in the packet processing system shown in FIG. 13;

DETAILED DESCRIPTION

Exemplary embodiments of a packet processing system according to the present invention will be explained hereinafter in detail with reference to the accompanying drawings. In the first embodiment, an example in which the packet processing system according to the present invention is applied to a load balancer that distributes a load of a server using a virtual IF will be explained. In the second embodiment, an example in which the packet processing system according to the present invention is applied to a load balancer that distributes the load of a server using a virtual IP address will be explained. In the third and the fourth embodiments, examples in which the packet processing system according to the present invention is applied to a router that separates a control device and a forwarding device using a virtual IF will be explained. In the fifth embodiment, a computer system that executes a packet processing program according to the present invention will be explained. Finally, various modifications as other embodiments will be explained.

In a first embodiment, the example in which the packet processing system according to the present invention is applied to the load balancer that distributes the load of the server using the virtual IF will be explained. The outline and features of the packet processing system in the first embodiment will be explained first, the configuration of the packet processing system will be explained next, and various processing procedures such as virtual IF registration procedures, distribution table registration procedures, data reception procedures, and data transmission procedures will be finally explained.

Figure 1:
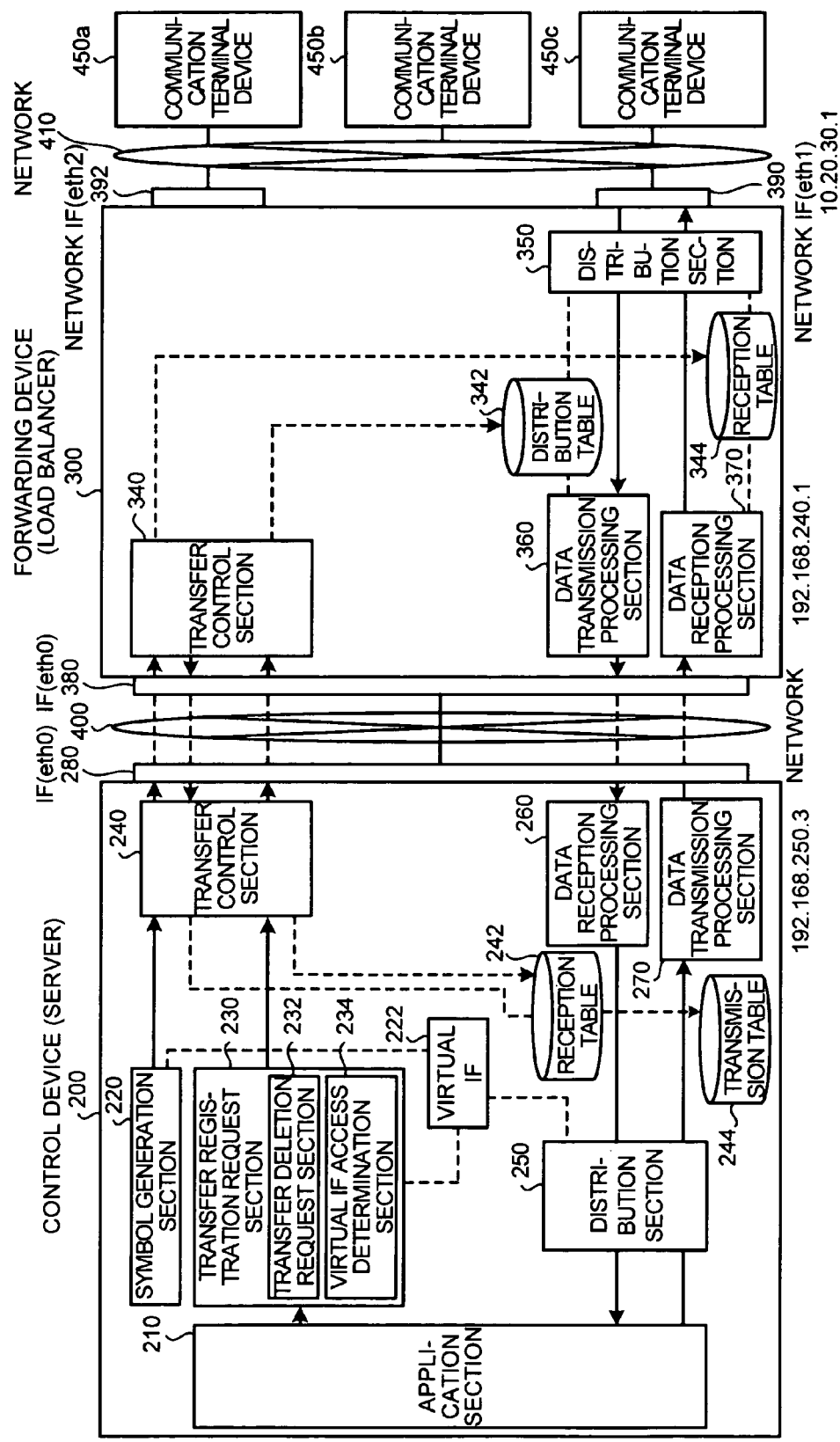
FIG. 1 is a functional block diagram which illustrates the configuration of a packet processing system in the first embodiment of the present invention.

An outline and main features of the packet processing system in the first embodiment will first be explained. FIG. 1 is a functional block diagram which illustrates the configuration of the packet processing system in the first embodiment.

The packet processing system shown in FIG. 1 is a system schematically constituted so that a forwarding device which transmits and receives a packet using a network IF and a control device which responds to the packet using an application based on a packet transfer rule for packet transfer between the forwarding device and the control device. According to this packet processing system, if a new application is started on the control device, the control device can dynamically set the packet transfer rule between the forwarding device and the control device and, thereby, the forwarding device and the control device can be separated and integrated without modifying a conventionally used application.

Specifically, the packet processing system according to a first aspect of the present invention is characterized as follows. If a server 200 detects that an application section 210 accesses a virtual IF 222 set to associate with address information on a load balancer 300, the server 200 requests the load balancer 300 to set a packet transfer rule for transferring a packet received on a network IF 390 to the server, and the load balancer sets a packet transfer rule for transferring the packet from the load balancer 300 to the server 200 to associate with the virtual IF 222. Therefore, if the new application section 210 is started on the server 200, then the server 200 can dynamically set the packet transfer rule between the server 200 and the load balancer 300 and the load balancer 300 and the server 200 can be separated from each other but integrated with each other without modifying the conventionally used application section 210.

A configuration of the packet processing system in the first embodiment will be explained. As shown in FIG. 1, the packet processing system consists of the control device 200, the forwarding device 300, communication terminal devices 450a to 450c, a network 400 connecting the control device 200 to the forwarding device 300, and a network 410 connecting the forwarding device 300 to the communication terminal devices 450a to 450c.

The networks 400 and 410 are networks, such as a LAN, a dedicated line, and the Internet, which hold communication according to for example, a TCP/IP protocol. Each of the communication terminal devices 450a to 450c is a device that transmits a service request to the forwarding device 300 to request various Internet services through the network 410.

The control device 200 is a server that accepts the service request from each of the communication terminal devices 450a to 450c through the network IF 390 of the forwarding device 300 and that provides various Internet services to the communication terminal device. Specifically, the control device 200 provides such services as Web (HTTP, HTTPS), FTP, Email (SMTP, POP, and IMAP), DNS, and DB (Oracle, DB2).

The control device 200 consists of the application section 210, a symbol generation section 220, the virtual IF 222, a transfer registration request section 230, a transfer control section 240, a reception table 242, a transmission table 244, a distribution section 250, a data reception processing section 260, a data transmission processing section 270, and an IF 280.

The application section 210 is a program that provides the Internet services and communicates with the communication terminal devices 450a. to 450c based on an Internet protocol, mainly a TCP/UDP protocol. The symbol generation section 220 is a processing section that sets and registers the virtual IF 222 in a kernel of an operating system (hereinafter, "OS") of the control device 200 to associate with the network IF 390 of the forwarding device 300.

The virtual IF 222 is a network IF that is virtually set by the symbol generation section 220 in the kernel of the OS of the control device 200 to associate with the network IF 390 of the forwarding device 300, Specifically, the application section 210 serves as a functional section that transmits and receives packets to and from the communication terminal devices 450a to 450c and has a data structure for managing, for example, attribute information, packet operation procedures, and statistical information.

The transfer registration request section 230 is a request section that detects that the application section 210 opens a communication port and accesses the virtual IF 222 and that issues a request to register an up tunnel for transferring a packet from the forwarding device 300 to the control device 200. Specifically, the transfer registration request section 230 includes a transfer deletion request section 232 and a virtual IF access determination section 234.

The transfer deletion request section 232 is a request section that detects that the application section 210 closes the communication port for access to the virtual IF 222 and issues a request to delete the up tunnel corresponding to the virtual IF 222. The virtual IF access determination section 234 is a request section that detects the application section 210 opens the communication port and accesses the virtual IF 222 and that requests the forwarding device 300 to transfer a packet.

The transfer control section 240 is notified by the symbol generation section 220 that the virtual IF 222 is set and transmits a down tunnel generation request message to the forwarding device 300. In addition, if receiving a tunnel generation response message from the forwarding device 300, the transfer control section 240 registers the virtual IF 222, a down tunnel, and the forwarding device 300 in the transmission table 244 while making them associate with one another. Further, the transfer control section 240 is notified by the transfer registration request section 230 that the application section 210 opens the communication port for access to the virtual IF 222, registers the virtual IF 222 and an up tunnel in the reception table 242 while making them associate with each other, and transmits a transfer request message to the forwarding device 300.

The tunnel generation request message transmitted from the transfer registration request section 230 to the forwarding device 300, the tunnel generation response message transmitted from the forwarding device 300, and the transfer request message transmitted from the transfer registration request section 230 to the forwarding device 300 will be explained. FIG. 2 illustrates one example of the tunnel generation request message in the packet processing system shown in FIG. 1. FIG. 3 illustrates one example of the tunnel generation response message in the packet processing system shown in FIG. 1. FIG. 4 illustrates one example of the transfer request message in the packet processing system shown in FIG. 1.

As shown in FIG. 2, the tunnel generation request message is a message for having an address of the control device 200, the virtual IF 222, and the network IF 390 associate with one another. As shown in FIG. 3, the tunnel generation response message is a message for notifying a down tunnel ID corresponding to an address of the forwarding device 300, the virtual IF 222, and the network IF 390. As shown in FIG. 4, the transfer request message is a message for notifying an up tunnel ID corresponding to the address of the control device 200, a protocol address, and the virtual IF 222.

The reception table 242 is an up tunnel management table provided in the control device 200 and making the virtual IF 222 and the up tunnel ID associate with each other. The transmission table 244 is a down tunnel management table provided in the control device 220 and making the virtual IF 222, the down tunnel ID, and the forwarding device address associate with one another. One example of the reception table 242 and that of the transmission table 244 in the packet processing system will be explained. FIG. 5 illustrates one example of the reception table 242 in the packet processing system shown in FIG. 1. FIG. 6 illustrates one example of the transmission table 244 in the packet processing system shown in FIG. 1.

The reception table 242 is a table for searching for the virtual IF 222 to which a packet transferred from the forwarding device 300 is to be transmitted based on the up tunnel ID of the packet. The transmission table 244 is a table for searching for the down tunnel ID and the address of the forwarding device 300 based on the virtual IF 222 to which the application section 210 transmits the packet.

The distribution section 250 is a processing section that transfers the packet transmitted from the application section 210 along the down tunnel while making the packet associate with the virtual IF 222. Specifically, the distribution section 250 determines the virtual IF 222 based on a destination address of the packet and transfers the packet to the data transmission processing section 270 corresponding to the virtual IF 222 along the down tunnel. In addition, the distribution section 250 is the processing section that receives the packet transferred from the data reception processing section 260 along the up tunnel and that transfers the packet to the application section 210 along the up tunnel and a header of the packet.

The data reception processing section 260 is a processing section that receives the packet transferred from the forwarding device 300 along the up tunnel, searches the reception table 242 which makes the packet and the virtual IF 222 associate with each other, and that transfers the packet along the up tunnel while making the packet associate with the virtual IF 222. Specifically, if the data reception processing section 260 receives the packet to which the up tunnel ID is added and which is encapsulated, then the data reception processing section 260 searches the reception table 242 for the corresponding virtual IF 222 using the up tunnel ID as a key, decapsulates the packet, and transfers the packet to the distribution section 250 along the up tunnel while making the packet associate with the virtual IF 222.

The data transmission processing section 270 is a processing section that receives the packet transferred from the distribution section 250 along the down tunnel, searches the transmission table 244 which makes the packet associate with the down tunnel, and that transfers the packet to the forwarding device 300 along the down tunnel. Specifically, if the data transmission processing section 270 receives the packet from the distribution section 250, then the data transmission processing section 270 searches the transmission table 244 for the down tunnel ID using the virtual IF 222 corresponding to the packet as a key, encapsulates the packet, and transfers the encapsulated packet to the forwarding device 300 along the down tunnel. The IF 280 is an interface for allowing the control device 200 to hold communication with the forwarding device 300 through the network 400.

The forwarding device 300 is a load balancer that receives the service request from each of the communication terminal devices 450*a* to 450*c* connected to the forwarding device 300 through the network 410 and relays the service request to the control device 200, and that relays the packet transferred from the control device 200 to each of the communication terminal devices 450*a* to 450*c* in response to the service request from the communication terminal device.

The forwarding device 300 consists of a transfer control section 340, a distribution table 342, a reception table 344, a distribution section 350, a data transmission processing section 360, a data reception processing section 370, an IF 380, and network IFs 390 and 392. If receiving the tunnel generation request message from the control device 200, the transfer control section 340 transmits the tunnel generation response message, notifies the control device 200 of an unused down tunnel ID, and registers the down tunnel in the reception table 344. If receiving the transfer request message from the control device 200, the transfer control section 340 registers the up tunnel ID, a port number of the application section 210, and a destination control device address in the distribution table 342.

The distribution table 342 is an up tunnel management table provided in the forwarding device 300 and making the network IF 390, the port number of the application section 210, the up tunnel ID, and the destination control device address associate with one another. The reception table 344 is a down tunnel management table provided in the forwarding device 300 and making the down tunnel ID and the network IF 390 associate with each other. One example of the distribution table 342 and that of the reception table 344 in the packet processing system will be explained. FIG. 7 illustrates one example of the distribution table 342 in the packet processing system shown in FIG. 1. FIG. 8 illustrates one example of the reception table 344 in the packet processing system shown in FIG. 1.

The distribution table 342 is a table for searching for the application section 210 to which the packet received at the network IF is to be transmitted, based on a destination address of the packet. The reception table 344 is a table for searching for the network IF 390 to which the packet transferred from the control device 200 is to be transmitted, based on the down tunnel ID of the packet.

The distribution section 350 is a processing section that searches the distribution table 342 making the packet received at the network IF 390 associate with a up tunnel, transfers the packet along the up tunnel if the destination of the packet is the application section 210 of the control device 200, and that transfers the packet received from the data reception processing section 370.to the corresponding network IF 390 along the down tunnel.

The data transmission processing section 360 is a processing section that receives the packet transferred along the up tunnel by the distribution section 350, searches the distribution table 342 making the packet associate with the control device 200, and that transfers the packet to the control device 200 along the up tunnel. Specifically, if receiving the packet from the distribution section 350, the data transmission processing section 360 searches the distribution table 342 for the tunnel ID and the destination control device address using the protocol address of the packet as a key, encapsulates the packet, and transfers the encapsulated packet to the control device 200 along the up tunnel.

The data reception processing section 370 is a processing section that receives the packet transferred by the control device 200 along the down tunnel, searches the reception table 344 making the packet associate with the network IF 390, and that transfers the packet to the network IF 390 along the down tunnel. Specifically, if receiving the packet to which the down tunnel ID is added and thereby encapsulated, the data reception processing section 370 searches the reception table 344 for the corresponding network IF 390 using the down tunnel ID as a key, decapsulates the packet, and transfers the packet to the distribution section 350 while making the packet associate with the network IF 390.

The network IFs 390 and 392 are interfaces between the forwarding device 300 and the communication terminal devices 450a to 450c connected to the forwarding device 300 through the network 410. The IF 380 is an interface for allowing the forwarding device 300 to communicate with the control device 200 through the network 400.

Figure 9:
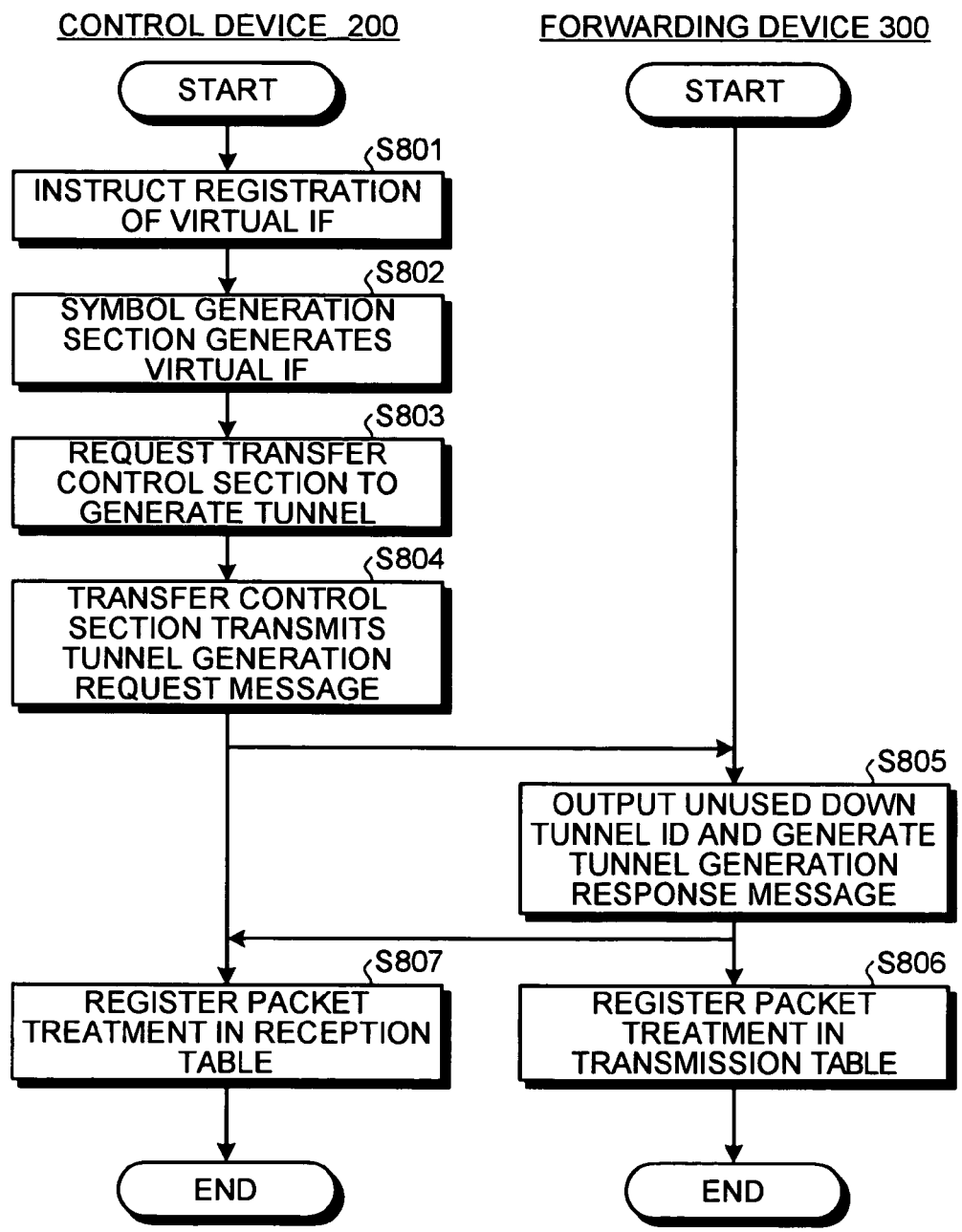
FIG. 9 is a flow chart which illustrates virtual IF registration procedures in the packet processing system shown in FIG. 1.

Virtual IF registration procedures in the packet processing system shown in FIG. 1 will be explained next. FIG. 9 is a flow chart which illustrates the virtual IF registration procedures in the packet processing system shown in FIG. 1.

An administrator instructs registration of the virtual IF 222 using the symbol generation section 220 (at step S801). The symbol generation section 220 generates the virtual IF 222 in the control device 200 while making the virtual IF 222 associate with the network IF 390 (at step S802). The symbol generation section 220 requests the transfer control section 240 to generate the down tunnel for transferring the packet from the virtual IF 222 of the control device 200 to the network IF 390 of the forwarding device 300 (at step S803). The transfer control section 240 of the control device 200 transmits the tunnel generation request message shown in FIG. 2 to the forwarding device 300 (at step S804).

The transfer control section 340 of the forwarding device 300 outputs an unused down tunnel ID and transmits the tunnel generation response message shown in FIG. 3 to the control device 200 (at step S805). In addition, the transfer control section 340 registers the packet in the reception table 344 of the forwarding device 300 while making the packet associate with the down tunnel ID and the network IF 390 (at step S806). Upon receiving the tunnel generation response message from the forwarding device 300, the transfer control section 240 of the control device 200 registers the packet in the reception table 242 while making the packet associate with the up tunnel ID and the virtual IF 222 (at step S807).

Figure 10:
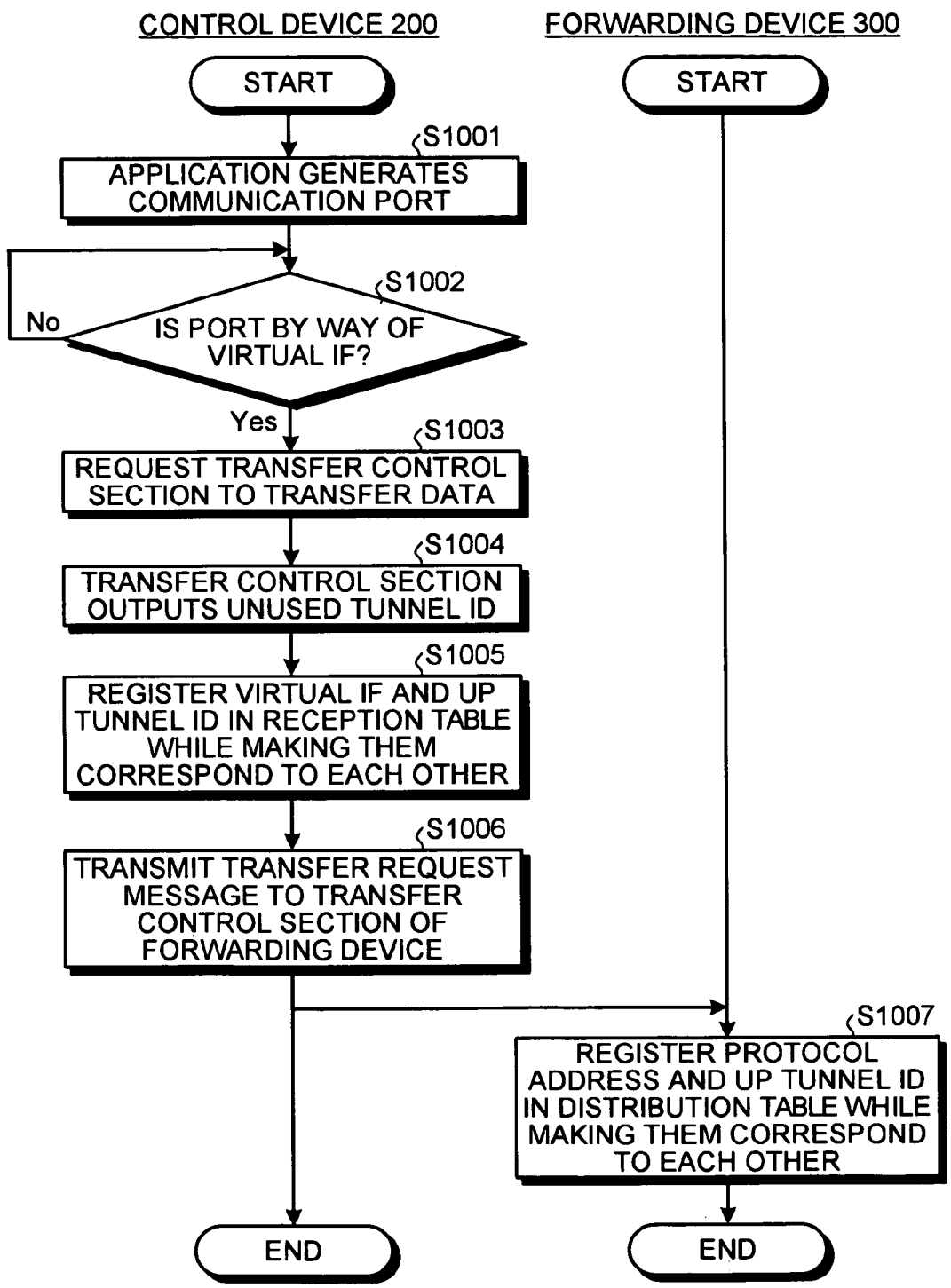
FIG. 10 is a flow chart which illustrates distribution table registration procedures in the packet processing system shown in FIG. 1.

Distribution table registration procedures in the packet processing system shown in FIG. 1 will be explained. FIG. 10 is a flow chart which illustrates the distribution table registration procedures in the packet processing system shown in FIG. 1.

The application section 210 requests the kernel of the OS to open the communication port for holding communication (at step S1001). The transfer registration request section 230 waits until the application section 21 0 opens the port by way of the virtual IF 222 (at step S1 002). If the port by way of the virtual IF 222 is opened, the transfer registration request section 230 requests the transfer control section 240 to transfer data (at step S1003). Specifically, the transfer registration request section 230 requests the kernel of the OS to set the distribution table 342 so as to be able to transfer the packet from the forwarding device 300 to the control device 200 along the up tunnel, and to generate the up tunnel.

The transfer control section 240 of the control device 200 outputs an unused up tunnel ID and registers the packet in the reception table 242 while making the packet associate with the up tunnel ID and the virtual IF 222 (at step S1005). Further, the transfer control section 240 transmits the transfer request message shown in FIG. 4 to the transfer control section 340 of the forwarding device 300 (at step S1006).

The transfer control section 340 of the forwarding device 300 receives the transfer request message from the control device 200, and registers the protocol address, the up tunnel ID, and the control device address included in the transfer request message in the distribution table 342 while making them associate with one another (at step S1007).

As explained above, if detecting that the application section 210 accesses the virtual IF 222 set to associate with the address information on the forwarding device 300, the control device 200 requests the forwarding device 300 to set the packet transfer rule for transferring the received packet using the network 390 to the control device 200, and sets the packet transfer rule for transferring the packet to the control device 200 from the forwarding device 300 while making the packet associate with the virtual IF 222. The forwarding device 300 sets the packet transfer rule requested by the control device 200. Therefore, if a new application is started on the control device 200, the control device 200 can dynamically set the packet transfer rule between the control device 200 and the forwarding device 300, thereby making it possible to separate and integrate the forwarding device 300 and the control device 200 without modifying the conventionally used application.

Further, if detecting that the application section 21 0 closes the communication port for access to the virtual IF 222, then the control device 200 requests the forwarding device 300 to delete the packet transfer rule for transferring the received packet using the network IF 390 to the control device 200, and deletes the packet transfer rule for transferring the packet from the forwarding device 300 to the control device 200 while making the packet associate with the virtual IF 222, and the forwarding device 300 deletes the packet transfer rule requested by the rule device 200. Therefore, if the application is stopped on the control device 200, the control device 200 can dynamically delete the packet transfer rule between the control device 200 and the forwarding device 300, thereby making it possible to separate and integrate the forwarding device 300 and the control device 200 without modifying the conventionally used application.

Figure 11:
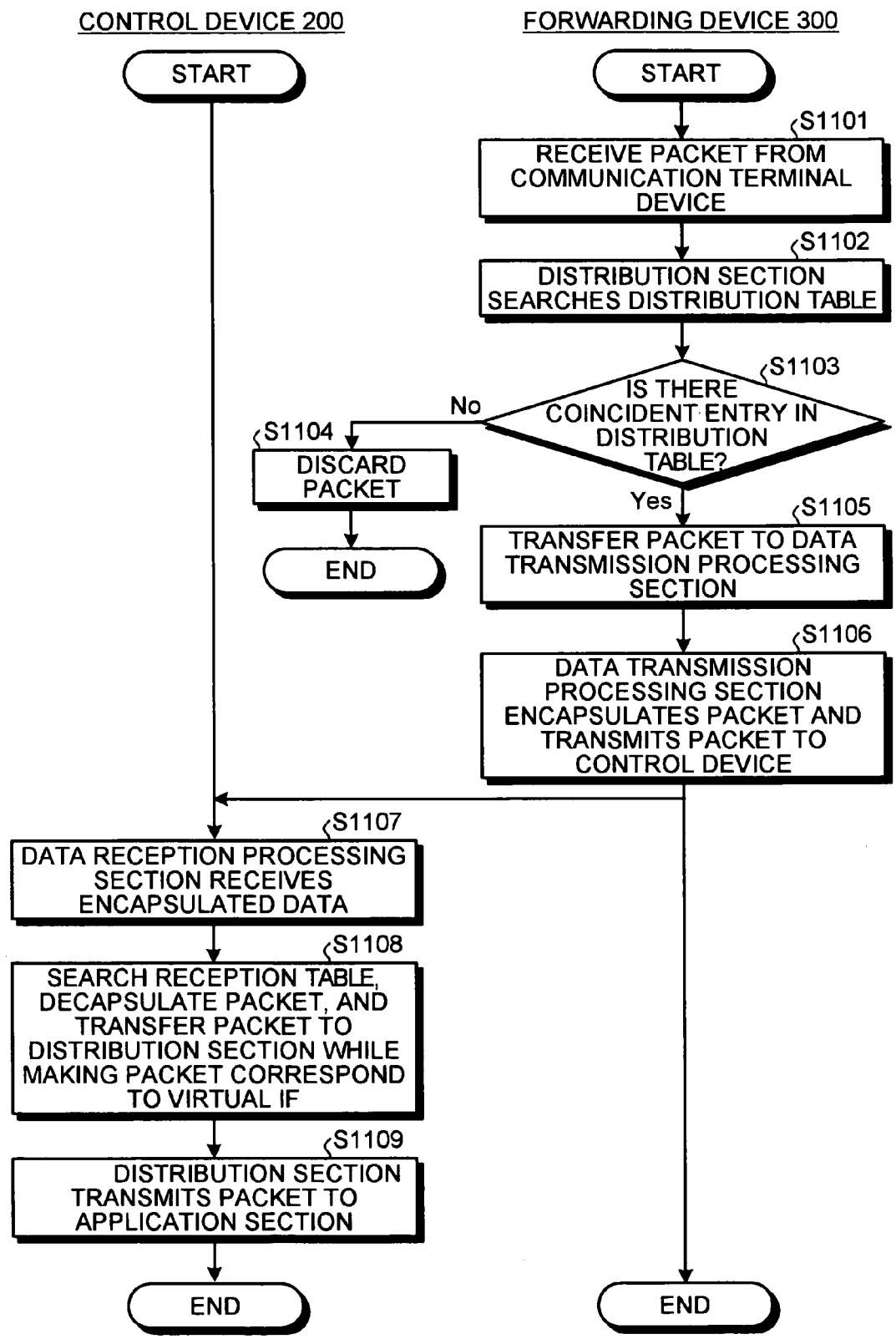
FIG. 11 is a flow chart which illustrates data reception procedures in the packet processing system shown in FIG. 1.

Data reception procedures in the packet processing system shown in FIG. 1 will be explained. FIG. 11 is a flow chart which illustrates the data reception procedures in the packet processing system shown in FIG. 1.

The forwarding device 300 first receives the packet from the communication terminal device (at step S1101). The distribution section 350 of the forwarding device 300 searches the distribution table 342 based on the protocol address of the packet (at step S1102) and determines whether the protocol address is to the application section 210 of the control device 200 (at step S1103). If the protocol address is not to the application section 210 of the control device 200 ("NO" at step S1103), the forwarding device 300 discards the packet (at step S1104).

If the protocol address is to the application section 210 of the control section 200 ("YES" at step S1103), the forwarding device 300 transfers the packet to the data transmission processing section 360 (at step S1105). The data transmission processing section 360 searches the distribution table 342 for the up tunnel ID based on the protocol address, adds the up tunnel ID to the packet to thereby encapsulate the packet, and transfers the encapsulated packet to the control device 200 (at step S1106).

The data reception processing section 260 of the control device 200 receives the encapsulated packet from the forwarding device 300 (at step S1107), searches the reception table 242 based on the up tunnel ID, decapsulates the packet, and transfers the decapsulated packet to the distribution section 250 while making the packet associate with the virtual IF 222 (at step S1108). Further, the distribution section 250 specifies the communication port of the application section 210 from the protocol address of the packet and transmits the packet to the application section 210 (at step S1109).

Figure 12:
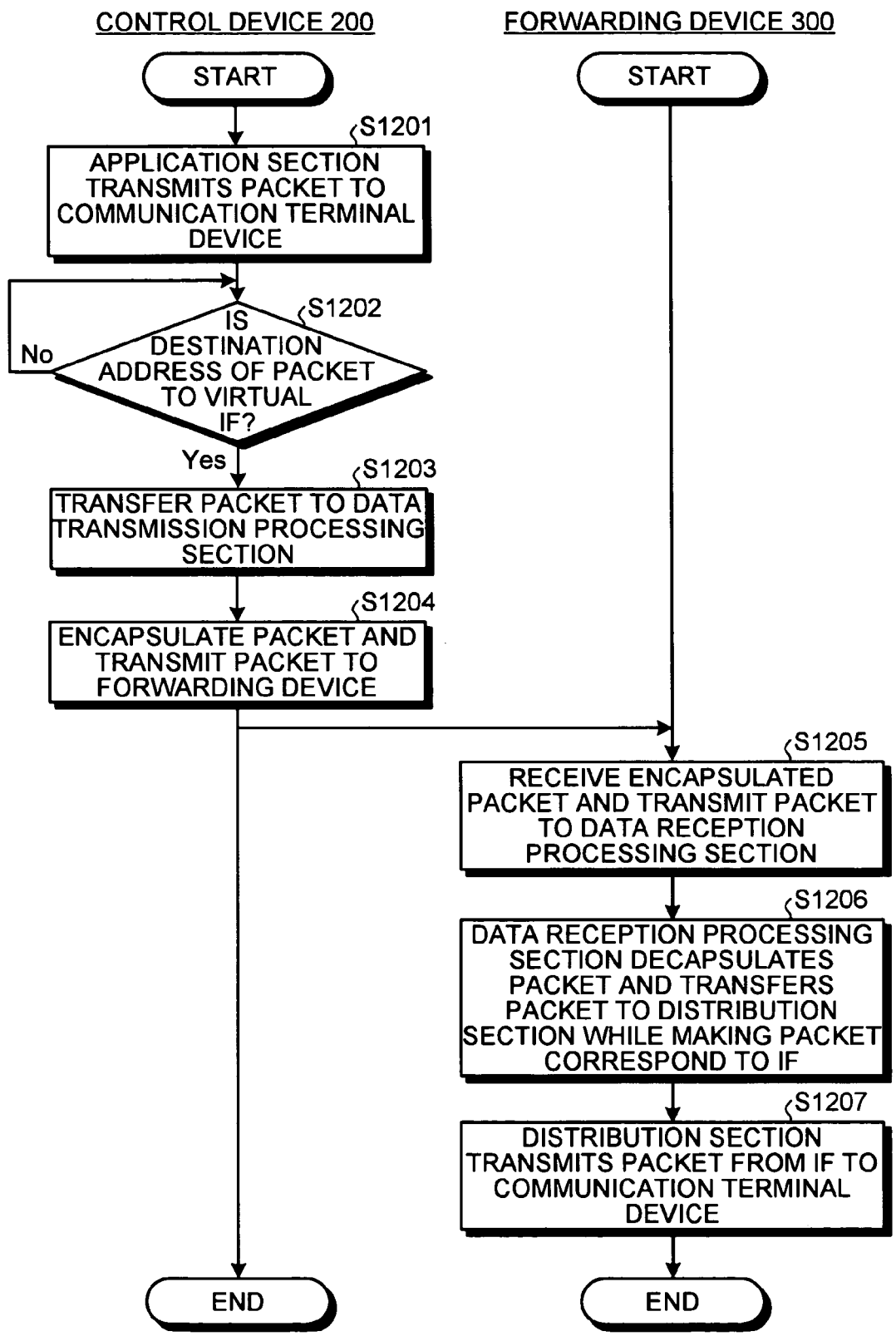
FIG. 12 is a flow chart which illustrates data transmission procedures in the packet processing system shown in FIG. 1.

Data transmission procedures in the packet processing system shown in FIG. 1 will be explained. FIG. 12 is a flow chart which illustrates the data transmission procedures in the packet processing system shown in FIG. 1.

The application section 210 transmits the packet to each of the communication terminal devices 450a to 450c (at step S1201). The distribution section 250 waits for the packet the destination address of which is to the virtual IF 222 (at step S1202) and transfers the packet to the data transmission processing section 270 (at step S1203). The data transmission processing section 270 searches the transmission table 244 for the down tunnel ID based on the virtual IF 222, adds the down tunnel ID to the packet to thereby encapsulate the packet, and transfers the packet to the forwarding device 300 (at step S1204).

The data reception processing section 370 of the forwarding device 300 receives the encapsulated packet from the control device 200 (at step S1205), searches the reception table 344 based on the down tunnel ID, decapsulates the packet, and transfers the decapsulated packet to the distribution section 350 while making the packet associate with the network IF 390 (at step S1206). The distribution section 350 transmits the packet from the network IF 390 to each of the communication terminal devices 450a to 450c (at step S1207).

In the first embodiment, the example of applying the packet processing system according to the present invention to the load balancer that distributes the load of the server using the virtual IF has been explained. However, the present invention is not limited to this example but can be also applied to a load balancer that distributes the load of the server using a virtual IP address. In a second embodiment, therefore, an example of applying the packet processing system according to the present invention to the load balancer that distributes the load of the server using the virtual IP address will be explained. The configuration of the packet processing system in the second embodiment will be explained first, and various processing procedures of the packet processing system such as virtual IP address registration procedures, distribution table registration procedures, data reception procedures, and data transmission procedures will be explained next. The same sections as those in the first embodiment will not be explained but only different sections will be mainly explained herein.

Figure 13:
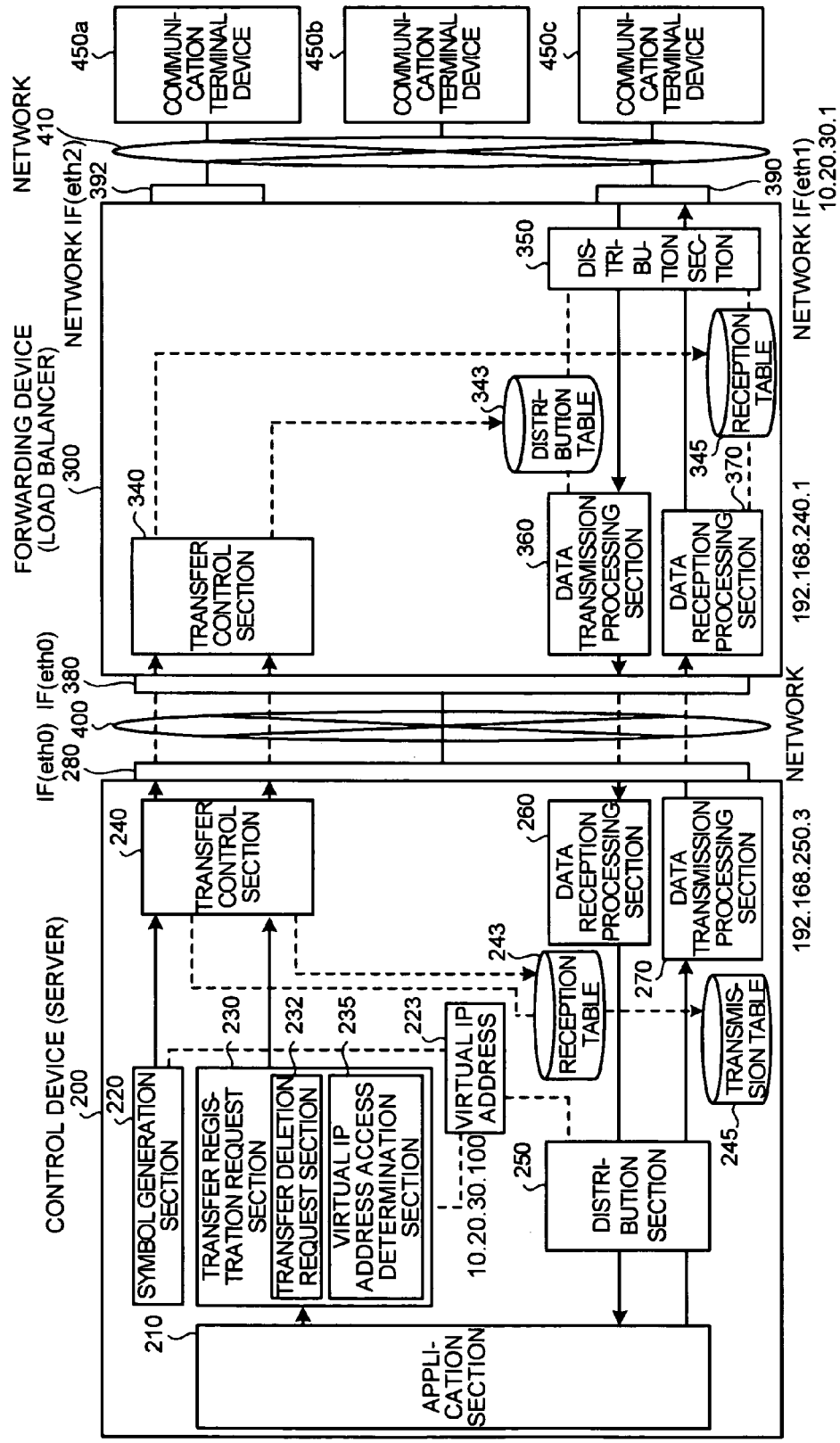
FIG. 13 is a functional block diagram which illustrates the configuration of a packet processing system in the second embodiment of the present invention.

A configuration of the packet processing system in the second embodiment will be explained. FIG. 13 is a functional block diagram which illustrates the configuration of the packet processing system in the second embodiment. The packet processing system in the second embodiment differs from that in the first embodiment by including a virtual IP address 223, a virtual IP address access determination section 235, a reception table 243, and a transmission table 245 in the control device 200, and a distribution table 343 and a reception table 345 in the forwarding device 300.

The virtual IP address 223 is an IP address virtually set by the symbol generation section 220 in the kernel of the OS of the control device 200 to associate with an IP address of the forwarding device 300. Specifically, each of the communication terminal devices 450a to 450c transmits a packet to the IP address of the forwarding device 300.

The virtual IP address access determination section 235 is a request section that detects that the application section 210 opens the communication port and accesses the virtual IP address 223, and that requests the forwarding device 300 to transfer the packet.

The reception table 243 is an up address conversion management table provided in the control device 200 and making a destination IP address, a destination port number, and the virtual IP address 223 associate with one another. The transmission table 245 is a down address conversion management table provided in the control device 200 and making the virtual IP address 223 and a sender IP address associate with each other. One example of the reception table 243 and that of the transmission table 245 in the packet processing system will be explained. FIG. 14 illustrates one example of the reception table 243 in the packet processing system shown in FIG. 13. FIG. 15 illustrates one example of the transmission table 245 in the packet processing system shown in FIG. 13.

The reception table 243 is a table for converting the destination IP address of the packet transferred from the forwarding device 300 to the virtual IP address 223 to which the packet is to be transmitted. The transmission table 245 is a table for converting the virtual IP address 223 to which the application section 210 transmits the packet, to the sender IP address.

The distribution table 343 is an up address conversion management table provided in the forwarding device 300 and making a port number of the application section 210 and a destination IP address associate with each other. The reception table 345 is a down address conversion management table provided in the forwarding device 300 and making the virtual IP address 223 and the transmission IP address associate with each other. One example of the distribution table 343 and that of the reception table 345 in the packet processing system will be explained. FIG. 16 illustrates one example of the distribution table 343 in the packet processing system shown in FIG. 13. FIG. 17 illustrates one example of the reception table 345 in the packet processing system shown in FIG. 13.

The distribution table 343 is a table for searching for the port number of the application section 210 to which the packet received at the network IF is to be transmitted, from a destination protocol address of the packet. The reception table 345 is a table for converting the sender IP address of the packet transferred from the control device 200 to the virtual IP address 223.

Virtual IP address registration procedures in the packet processing system shown in FIG. 13 will be explained. FIG. 18 is a flow chart which illustrates the virtual IP address registration procedures in the packet processing system shown in FIG. 13.

The administrator instructs registration of the virtual IP address 223 using the symbol generation section 220 (at step S1801). The symbol generation section 220 generates the virtual IP address 223 to associate with the IP address of the control device 200 (at step S1802). The symbol generation section 220 requests the transfer control section 240 to register the virtual IP address and the sender IP address (at step S1 803). The transfer control section 240 of the control device 200 transmits an address conversion request message shown in FIG. 18 to the forwarding device 300 (at step S1804). The transfer control section 340 of the forwarding device 300 registers the virtual IP address 223 and the sender IP address in the reception table 344 of the forwarding device 300 while making them associate with each other (at step S1805). The address conversion request message transmitted from the transfer control section 240 will be explained. FIG. 19 illustrates one example of the address conversion request message in the packet processing system shown in FIG. 13. The address conversion request message is a message for making the virtual IP address 223 and the sender IP address associate with each other.

Figure 20:
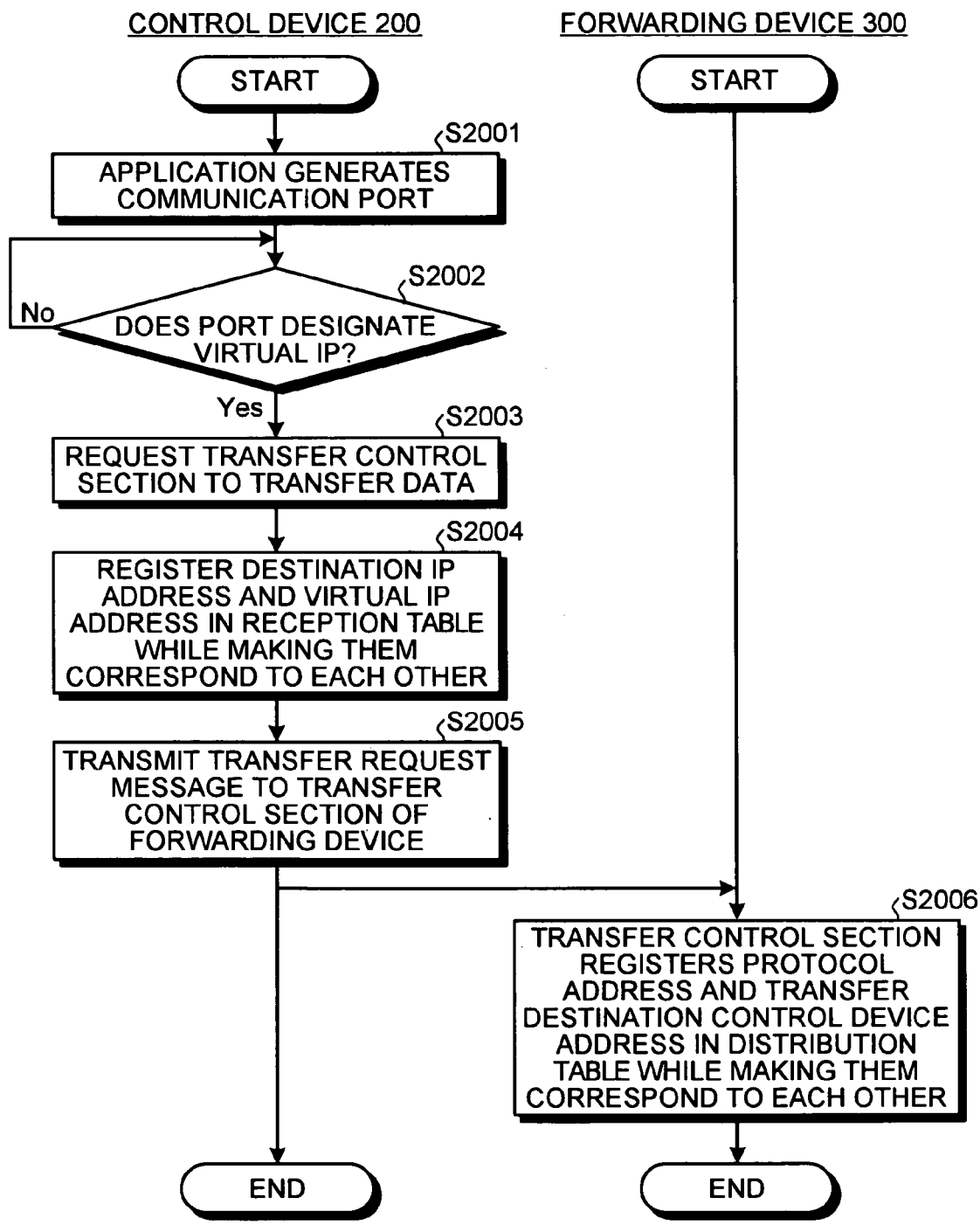
FIG. 20 is a flow chart which illustrates distribution table registration procedures in the packet processing system shown in FIG. 13.

Distribution table registration procedures in the packet processing system shown in FIG. 13 will be explained. FIG. 20 is a flow chart which illustrates the distribution table registration procedures in the packet processing system shown in FIG. 13.

The application section 210 requests the kernel of the OS to open the communication port for holding communication (at step S2001). The transfer path registration request section 230 waits until the application section 210 opens the port by way of the virtual IP address 223 (at step S2002). If the port by way of the virtual IP address 223 is opened, the transfer path registration request section 230 requests the transfer control section 240 to transmit a transfer request message (at step S2003).

The transfer control section 240 of the control device 200 registers the destination IP address and the virtual IP address 223 in the reception table 242 while making them associate with each other (at step S2004). Further, the transfer control section 240 transmits the transfer request message shown in FIG. 19 to the transfer control section 340 of the forwarding device 300 (at step S2005).

The transfer control section 340 of the forwarding device 300 receives the transfer request message from the control device 200, and registers the protocol address and the control device address included in the transfer request message in the distribution table 342 while making them associate with each other (at step S2006). The transfer request message transmitted from the transfer control section 240 will be explained.

FIG. 21 illustrates one example of the transfer request message in the packet processing system shown in FIG. 13. The transfer request message is a message for making the reception IP address and the virtual IP address associate with the protocol address and the control device address.

As explained above, if detecting that the application section 210 accesses the virtual IP address 223 set to associate with the address information on the forwarding device 300, the control device 200 requests the forwarding device 300 to set the packet transfer rule for transferring the packet received using the network IF 390 to the control device 200, and sets the packet transfer rule for transferring the packet to the control device 200 from the forwarding device 300 while making the packet associate with the virtual IP address 223. The forwarding device 300 sets the packet transfer rule requested by the control device 200. Therefore, if a new application is started on the control device 200, the control device 200 can dynamically set the packet transfer rule between the control device 200 and the forwarding device 300, thereby making it possible to separate and integrate the forwarding device 300 and the control device 200 without modifying the conventionally used application.

Further, if detecting that the application section 210 closes the communication port for accessing the virtual IP address 223, then the control device 200 requests the forwarding device 300 to delete the packet transfer rule for transferring the packet received using the network IF 390 to the control device 200, and deletes the packet transfer rule for transferring the packet from the forwarding device 300 to the control device 200 while making the packet associate with the virtual IP address 223, and the forwarding device 300 deletes the packet transfer rule requested by the control device 200. Therefore, if the application is stopped on the control device 200, the control device 200 can dynamically delete the packet transfer rule between the control device 200 and the forwarding device 300, thereby making it possible to separate and integrate the forwarding device 300 and the control device 200 without modifying the conventionally used application.

Figure 22:
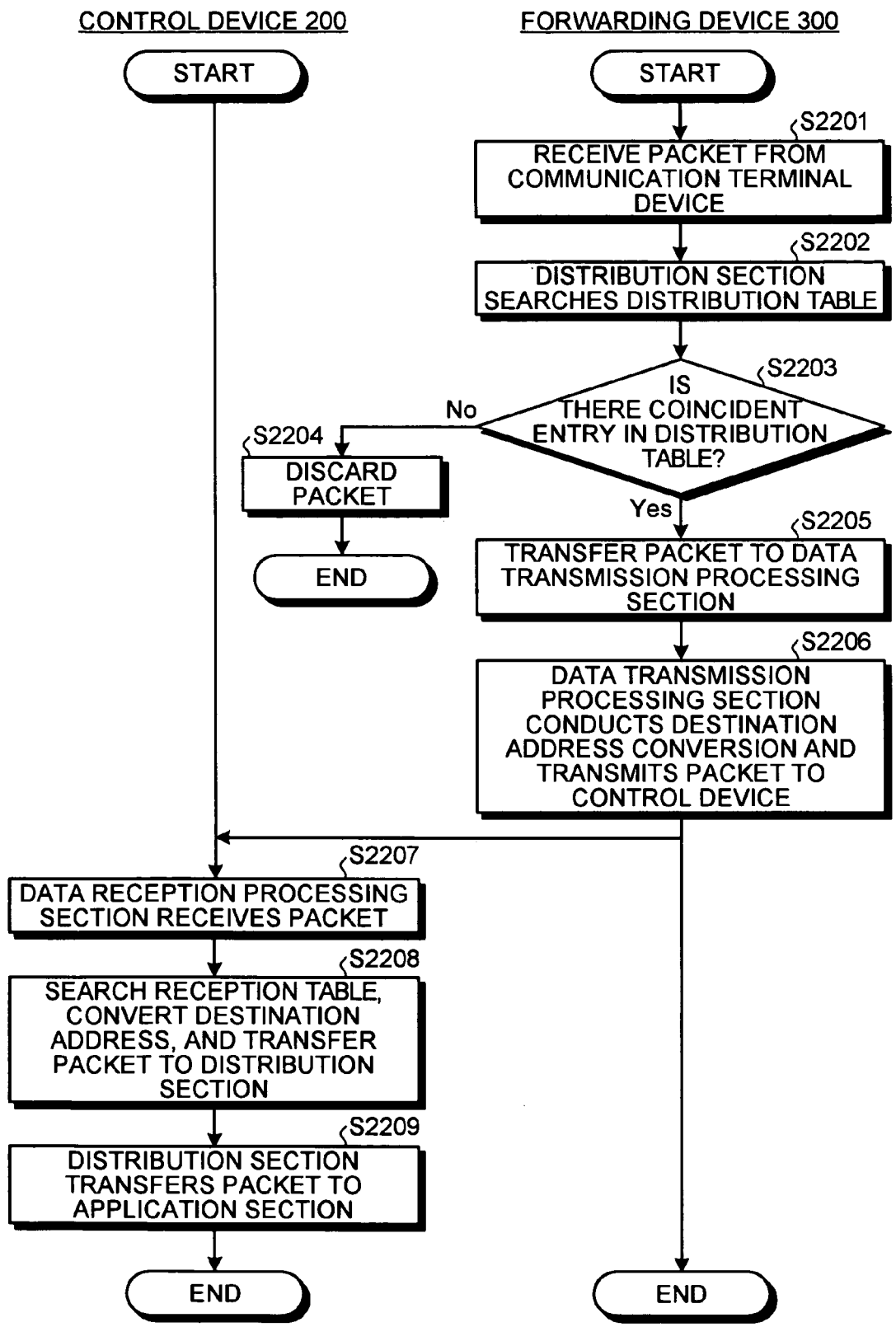
FIG. 22 is a flow chart which illustrates data reception procedures in the packet processing system shown in FIG. 13.

Data reception procedures in the packet processing system shown in FIG. 13 will be explained. FIG. 22 is a flow chart which illustrates the data reception procedures in the packet processing system shown in FIG. 13.

The forwarding device 300 first receives the packet from the communication terminal device (at step S2201). The distribution section 350 of the forwarding device 300 searches the distribution table 343 based on the protocol address of the packet (at step S2202) and determines whether the protocol address is to the application section 210 of the control device 200 (at step S2203). If the protocol address is not to the application section 210 of the control device 200 ("NO" at step S2203), the forwarding device 300 discards the packet (at step S2204).

If the protocol address is to the application section 21 0 of the control section 200 ("YES" at step S2203), the forwarding device 300 transfers the packet to the data transmission processing section 360 (at step S2205). The data transmission processing section 360 searches the distribution table 343 for the address of the transfer destination control device 200 based on the protocol address, converts the destination address of the packet to the address of the transfer destination control device 200, and transfers the packet to the control device 200 (at step S2206).

The data reception processing section 260 of the control device 200 receives the packet from the forwarding device 300 (at step S2207), refers to the reception table 242, converts the destination IP address to the virtual IP address 223, and transfers the packet to the distribution section 250 (at step S2208). Further, the distribution section 250 specifies the communication port of the application section 210 from the protocol address of the packet and transmits the packet to the application section 210 (at step S2209).

Figure 23:
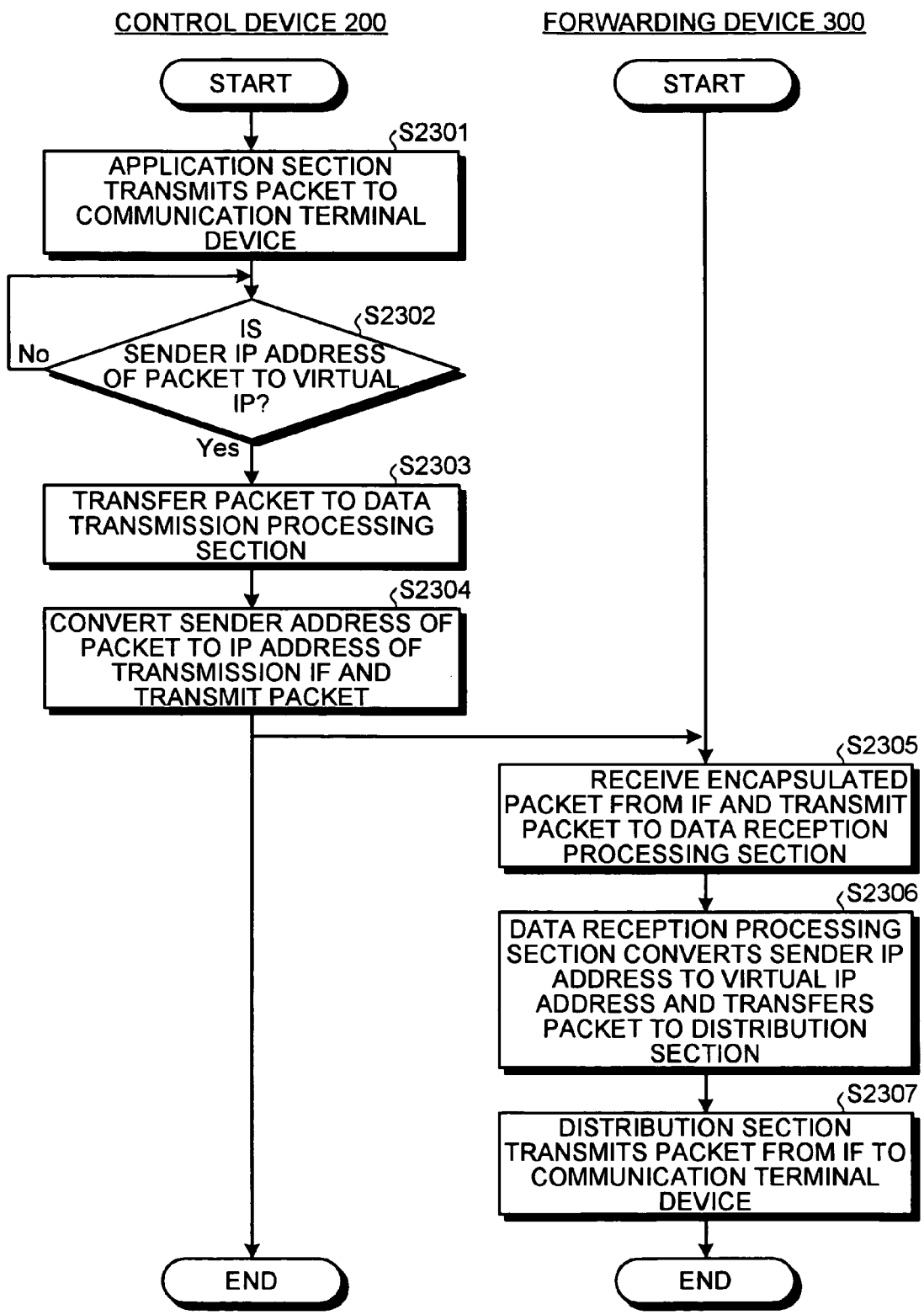
FIG. 23 is a flow chart which illustrates data transmission procedures in the packet processing system shown in FIG. 13.

The data transmission procedures in the packet processing system shown in FIG. 13 will be explained. FIG. 23 is a flow chart which illustrates data transmission procedures in the packet processing system shown in FIG. 13.

The application section 210 transmits the packet to the communication terminal device (at step S2301). The distribution section 250 waits for the packet the sender address of which is the virtual IP address 223 (at step S2302) and transfers the packet to the data transmission processing section 270 (at step S2303). The data transmission processing section 270 refers to the transmission table 245, converts the sender address of the packet to the IP address of the control device 200, and transfers the packet to the forwarding device 300 (at step S2304).

The data reception processing section 370 of the forwarding device 300 receives the packet from the control device 200 (at step S2305), searches the reception table 345 based on the sender IP address, converts the sender IP address of the packet to the virtual IP address 223, and transfers the packet to the distribution section 350 (at step S2306). The distribution section 350 transmits the packet from the network IF 390 to the communication terminal device (at step S2307).

In the first and the second embodiments, the examples of applying the packet processing system according to the present invention to the load balancer have been explained. However, the present invention is not limited to the examples but can be also applied to a router which separates the control device from the forwarding device. In a third embodiment, an example in which the packet processing system according to the present invention is applied to the router which separates the control device from the forwarding device will be explained. The configuration of the router in the third embodiment will be explained first, and various procedures such as procedures for generating an internal communication path between the virtual IF of the control device and the interface of the forwarding device in this router will be then explained.

Figure 24:
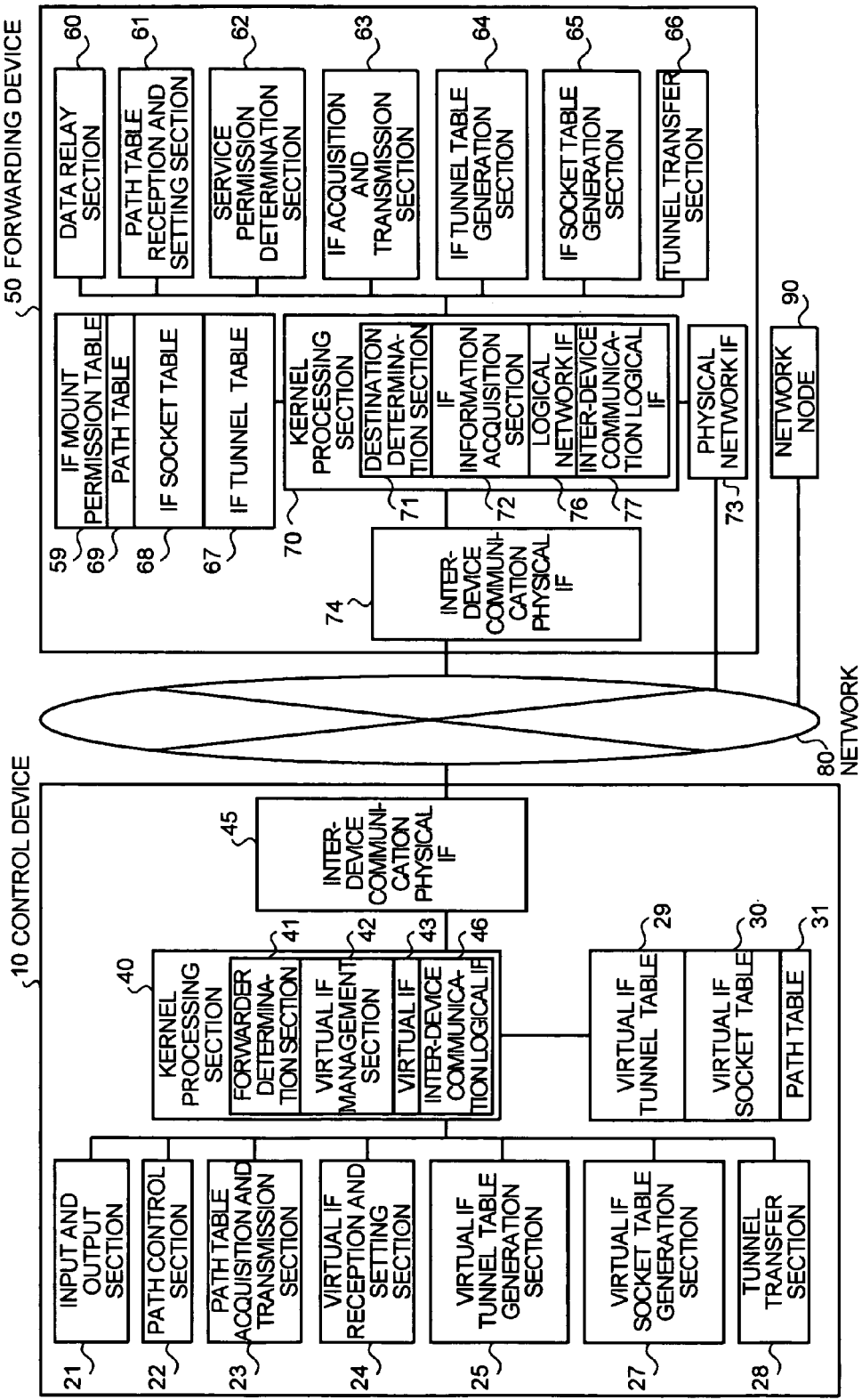
FIG. 24 is a functional block diagram which illustrates the configuration of a packet processing system in the third embodiment of the present invention.

A functional block diagram which illustrates the configuration of the packet processing system in the third embodiment will be explained. As shown in FIG. 24, the packet processing system consists of a control device 10, a forwarding device 50, a network 80, and a network node 90.

The network 80 is a communication network that can exchange data according to a communication protocol for a layer equal to or higher than a data link layer. The network 80 may be either a dedicated line or the Internet. For example, the router normally controls a path of a data packet and relays the data packet according to the communication protocol for a network layer. The network node 90 is a communication device such as the router connected to the network 80. In the third embodiment, the control device 10 communicates with the network node 90 through the forwarding device 50.

The control device 10 is a unit that shares a control function with the router. The control device 10 consists of an input and output section 21, a path control section 22, a path table acquisition and transmission section 23, a virtual IF reception and setting section 24, a virtual IF tunnel table generation section 25 (corresponding to a downstream internal communication path table generation unit according to Note 22), a virtual IF socket table generation section 27 (corresponding to an upstream internal communication path table generation unit according to Note 22), a tunnel transfer section 28, a virtual IF tunnel table 29 (corresponding to a downstream internal communication path table according to Note 22), a virtual IF socket table 30 (corresponding to an upstream internal communication path table according to Note 22), a path table 31, a kernel processing section 40, and an IF 45. The IF is an abbreviation of an interface. Unless specified otherwise, the IF is a generic term of a logical IF and a physical IF. Normally, the logical IF is paired with the physical IF.

The input and output section 21 is an input and output device that outputs operation states of the control device 10 and the forwarding device 50, responses to commands, and the like. Specifically, the input and output section 21 is a input/output device such as a keyboard, a mouse, a CRT or a liquid crystal display, or a printer.

The path control section 22 is a processing section that communicates with the network node 90 on the network through the network 80 and the forwarding device 50 and that exerts path control. Specifically, the path control section 22 acquires path control information from the network node 90 according to a path control protocol such as an RIP (Routing Information Protocol) or an OSPF (Open Shortest Path First), calculates the path based on the path control information, and generates a path table 31.

The path table acquisition and transmission section 23 is a processing section that acquires the path table 31 generated by the path control section 22 and that transmits the path table 31 to the forwarding device 50. Specifically, if the path control section 22 notifies the kernel processing section 40 that the path table 31 is updated, then the kernel processing section 40 notifies the path table acquisition and transmission section 23 of the update, and the path table acquisition and transmission section 23 acquires the path table 31 and transmits the path table 31 to the forwarding device 50 through the IF 45.

The virtual IF reception and setting section 24 is a processing section that accepts a virtual IF setting command from a user, requests the forwarding device 50 to acquire a logical network IF 76, receives the available logical network IF 76 from the forwarding device 50, and that sets a virtual IF 43 on the control device 10. The virtual IF reception and setting section 24 also notifies the tunnel transfer section 28 that the setting of the virtual IF 43 is completed.

The virtual IF tunnel table generation section 25 is a processing section that generates the virtual IF tunnel table 29 based on a tunnel identifier received from the forwarding device 50. The "tunnel" means herein an internal communication path that connects the control device 10 to the forwarding device 50. The data packet transferred along this internal communication path is encapsulated by adding thereto an identifier that identifies the internal communication path and a destination of the data packet is designated simultaneously with the encapsulation.

The virtual IF socket table generation section 27 is a processing section that generates the virtual IF socket table 30 for the internal communication path connecting the control device 10 to the forwarding device 50. Specifically, if the kernel processing section 40 is notified that a socket provided by the path control section 22 is opened to the virtual IF 43, the kernel processing section 40 notifies the virtual IF socket table generation section 27 of the opening of the socket. The virtual IF socket table generation section 27 transmits a socket address (corresponding to an input-output port identifier according to Note 22) and the tunnel identifier to an IF socket table generation section 65 of the forwarding device 50, and generates the virtual IF socket table 30.

The tunnel transfer section 28 is a processing section that connects the internal communication path between the control device 10 and the forwarding device 50 in response to the notification from the virtual IF reception and setting section 24 that the setting of the virtual IF 43 is completed. After connecting the internal communication path thereto, the tunnel transfer section 28 encapsulates the data packet received from the virtual IF 43 based on the virtual IF tunnel table 29 and the virtual IF socket table 30 and transmits the encapsulated packet to the forwarding device 50, and decapsulates the data packet received from the forwarding device 50 and transfers the decapsulated data packet to the virtual IF 43.

The virtual IF tunnel table 29 is a table for making the virtual IF 43 associate with the forwarding device IP address/tunnel identifier. Specifically, the table 29 is used to determine the internal communication path through which the data packet transmitted from the path control section 22 is passed when the data packet is transferred from the virtual IF 43 in a direction to the forwarding device 50. The virtual IF socket table 30 is a table for making the tunnel identifier associate with the virtual IF 43/a socket address (an IP address+a port number) of the path control section 22. Specifically, the table 30 is used to determine the virtual IF 43 at which the control device 10 receives the data packet from the internal communication path through which the data packet received by the forwarding device 50 is passed when the data packet is transferred from the forwarding device 50 in a direction to the virtual IF 43.

The path table 31 is a table for making an IP address of the destination of the data packet and an IP address of a next relay destination associate with each other. In other words, the path table 31 is a table that defines the communication path to the destination of the data packet obtained as a result of the path control of the path control section 22.

The kernel processing section 40 is a processing section that is a core of the OS and that performs file management, memory management, process execution and control, and the like. Specifically, the kernel processing section 40 includes at least a destination determination section 41, a virtual IF management section 42, and a virtual IF 43. If the socket is opened to the kernel processing section 40 for a process, the destination determination section 41 notifies the virtual IF socket table generation section 27 of the opening of the socket.

The virtual IF management section 42 is a processing section that manages the virtual IF 43. The virtual IF 43 is a logical IF made by the virtual IF reception and setting section 24 acquired from the logical network IF 76 of the forwarding device 50. Since the interface is set virtually to be separated from the physical IF, it is referred to as "virtual IF".

An inter-device communication physical IF 45 is a physical IF for allowing the control device 10 to communicate with the forwarding device 50. An inter-device communication logical IF 46 is an IF for allowing the control device 10 to communicate the data packet with the forwarding device 50 through the network 80. Specifically, the IF 46 is a communication IF such as an Ethernet® 10BASE-T or RS-232C that includes a device driver.

The forwarding device 50 is a device that shares a relay function with the router. The forwarding device 50 consists of a data relay section 60, a path table reception and setting section 61, service permission determination section 62, an IF acquisition and transmission section 63, an IF tunnel table generation section 64 (corresponding to a downstream internal communication path table generation section according to the Note 22), an IF socket table generation section 65 (corresponding to an upstream internal communication path table generation section according to the Note 22), a tunnel transfer section 66, an IF mount permission table 59, an IF tunnel table 67 (corresponding to a downstream internal communication path table according to the Note 22), an IF socket table 68 (corresponding to an upstream internal communication path table according to the Note 22), a path table 69, a kernel processing section 70, a physical network IF 73, and an inter-device communication physical IF 74.

The data relay section 60 is a processing section that transmits the data packet received by the forwarding device 50 to the next destination. Specifically, if a destination determination section 71 of the kernel processing section 70 determines that the data packet is a data packet to be transferred to the other device based on the header of the data packet, the kernel processing section 70 notifies the data relay section 60 of the determination result and the data relay section 60 transmits the data packet to the next destination based on the path table 69.

The path table reception and setting section 61 is a processing section that receives the path table 31 transmitted from the path table acquisition and transmission section 23 and that sets the path table 31 to the path table 69. The service permission determination section 62 is a determination section that determines whether to permit use of the logical network IF 76 based on the IF setting and permission table 59 if the virtual IF reception and setting section 24 of the control device 10 issues a request to use the logical network IF 76. The IF acquisition and transmission section 63 is a processing section that acquires attribute information on the logical IF from the logical network IF 76 managed by an IF information acquisition section 72 of the kernel processing section 70, and that transmits the acquired attribute information to the virtual IF reception and setting section 24 of the control device 10.

The IF tunnel table generation section 64 is a processing section that transmits the tunnel identifier to the virtual IF tunnel table generation section 25 of the control device 10 and that generates the IF tunnel table 67. The IF socket table generation section 65 receives the socket address and the tunnel identifier from the virtual IF socket table generation section 27 of the control device 10 and generates the IF socket table 68.

The tunnel transfer section 66 encapsulates the data packet based on the IF tunnel table 67 and the IF socket table 68 and transmits the encapsulated data packet to the control device 10. In addition, the tunnel transfer section 66 decapsulates the data packet received from the control device 10 and transfers the decapsulated data packet to the logical network IF 76.

The IF tunnel table 67 is a table for determining the logical IF 76 from which the data packet is output based on the internal communication path through which the data packet transmitted from the path control section 22 is passed when the data packet is transferred from the control device 10 in the direction to the forwarding device 50. Specifically, the IF tunnel table 67 is a table for making the tunnel identifier associate with the logical network IF 76. The IF socket table 68 is a table for determining the internal communication path through which the data packet received at the physical network IF 73 is passed when the data packet is transferred from the forwarding device 50 in the direction of the control device 1 0. Specifically, the IF socket table 68 is a table for making the logical network IF 76/socket address associate with the tunnel identifier.

The path table 69 is a table set by the path table reception and setting section 61 based on the path table 31 received from the path table acquisition and transmission section 23. Specifically, the path table 69 is a table for making the IP address of the destination of the data packet associate with a next IP address. The IF mount permission table 59 is a table with which control device to which are available the logical network IF 76 of the forwarding device 50 is defined in advance. Specifically, the IF mount permission table 59 is a table for making the logical network IF 76 associate with the IP address of the permitted control device 10.

The kernel processing section 70 is a processing section that is a core of the OS and that performs file management, memory management, processing execution and control, and the like. Specifically, the kernel processing section 70 includes at least the destination determination section 71, the IF information acquisition section 72, the logical network IF 76, and an inter-device communication IF 77. The destination determination section 71 is a processing section that determines the destination of the data packet based on the header of the data packet and that notifies the relevant processing sections of the destination if necessary. Specifically, the destination determination section 71 acquires the IP address from an IP header of the data packet, reads a destination port number from a TCP header, and determines the destination of the data packet.

The IF information acquisition section 72 is a processing section that manages the logical network IF 76. The logical network IF 76 is a logical IF corresponding to the physical network IF 73. The logical network IF 76 is paired with the physical network IF 73 to form the network IF.

The physical network IF 73 is an IF used when the forwarding device 50 communicates with the network node 90 or the control device 10 through the network 80. The inter-device communication IF 74 is an IF used when the forwarding device 50 communicates with the data packet with the control device 10 through the network 80. Specifically, the inter-device communication IF 74 is a communication IF such as the Ethernet® 10BASE-T or RS-232C including the device driver.

Figure 25:
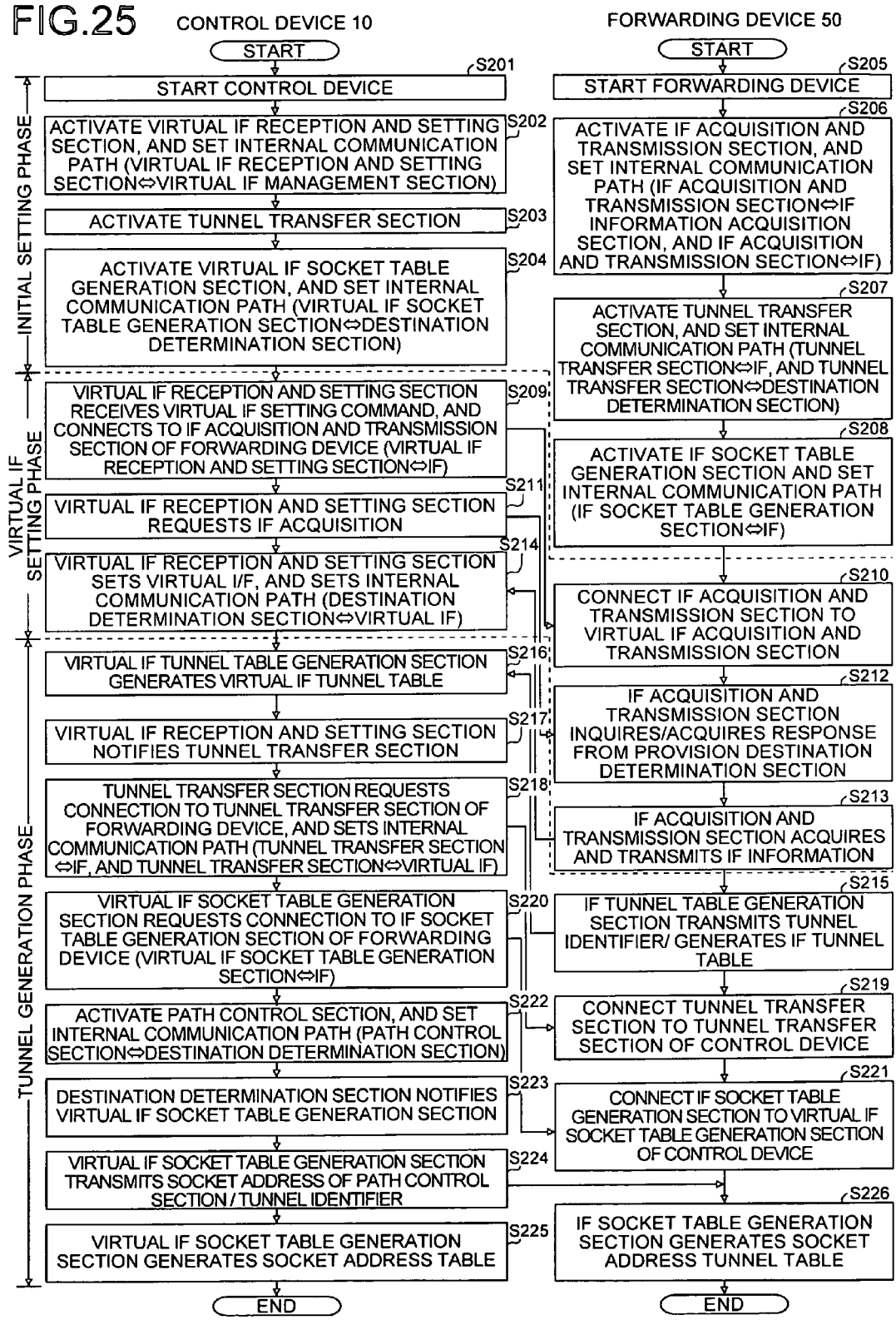
FIG. 25 is a flow chart which illustrates processing procedures for virtual IF setting and internal communication path setting in the packet processing system shown in FIG. 24.

Processing procedures for the virtual IF setting and internal communication path generation in the packet processing system shown in FIG. 24 will be explained. FIG. 25 is a flow chart which illustrates the processing procedures for the virtual IF setting and internal communication path generation in the packet processing system shown in FIG. 24. As shown in FIG. 25, the processing procedures are roughly classified to an initial setting phase including steps S201 to S208, a virtual IF setting phase including steps S209 to S214, and a tunnel generation phase including steps S215 to S226.

In the initial setting phase, the control device 10 and the forwarding device 50 activate the respective processing sections. As shown in FIG. 25, when the control device 10 is started (at step S201), the virtual IF reception and setting section 24, the tunnel transfer section 28, and the virtual IF socket table generation section 27 are activated in this order (at steps S202 to S204). Synchronously with the activation of these sections 24, 28, and 27, part of the internal communication path for generating the tunnel (the virtual IF reception and setting section 24 ↔ the virtual IF management section 42, and the virtual IF socket table generation section 27 ↔ the destination determination section 41) is generated.

Likewise, when the forwarding device 50 is started (at step S205), the IF acquisition and transmission section 63, the tunnel transfer section 66, and the IF socket table generation section 65 are activated in this order (at steps S206 to S208). Synchronously with the activation of these sections 63, 66, and 65, part of the internal communication path for generating a tunnel (the IF acquisition and transmission section 63 ↔ the IF information acquisition section 72, the IF acquisition and transmission section 63 ↔ the inter-device communication IF 74, the tunnel transfer section 66 ↔ inter-device communication IF 74, the tunnel transfer section 66 ↔ the destination determination section 71, and the IF socket table generation section 65 ↔ the IF 74) is generated.

The initial setting phase is followed by the virtual IF setting phase. In the virtual IF setting phase, the virtual IF reception and setting section 24 receives a virtual IF setting command, sets the internal communication path (the virtual IF reception and setting section 24 ↔ the inter-device communication IF 45), and starts communicating with the IF acquisition and transmission section 63 of the forwarding device 50 (at steps S209 to S210).

The virtual IF reception and setting section 24 then issues a request to use the logical network IF 76 of the forwarding device 50 (at step S211). The IF acquisition and transmission section 63 of the forwarding device 50 which receives the request of the use of the logical network IF 76 inquires the service permission determination section 62 whether to permit the use of the logical network IF 76. The provision destination determination section 62 determines whether to provide the logical network IF 76 based on the preset IF mount permission table 59 and transmits a response to the IF acquisition and transmission section 63 (at step S212).

The IF acquisition and transmission section 63 transmits attribute information on the logical network IF 76 to the virtual IF reception and setting section 24 based on the response (at step S213). The virtual IF reception and setting section 24 transfers the received attribute information on the logical network IF 76 to the virtual IF management section 42 of the kernel processing section 40, sets the virtual IF 43, and sets the internal communication path (the destination determination section 41 ↔ the virtual IF 43) (at step S214).

Figure 26:
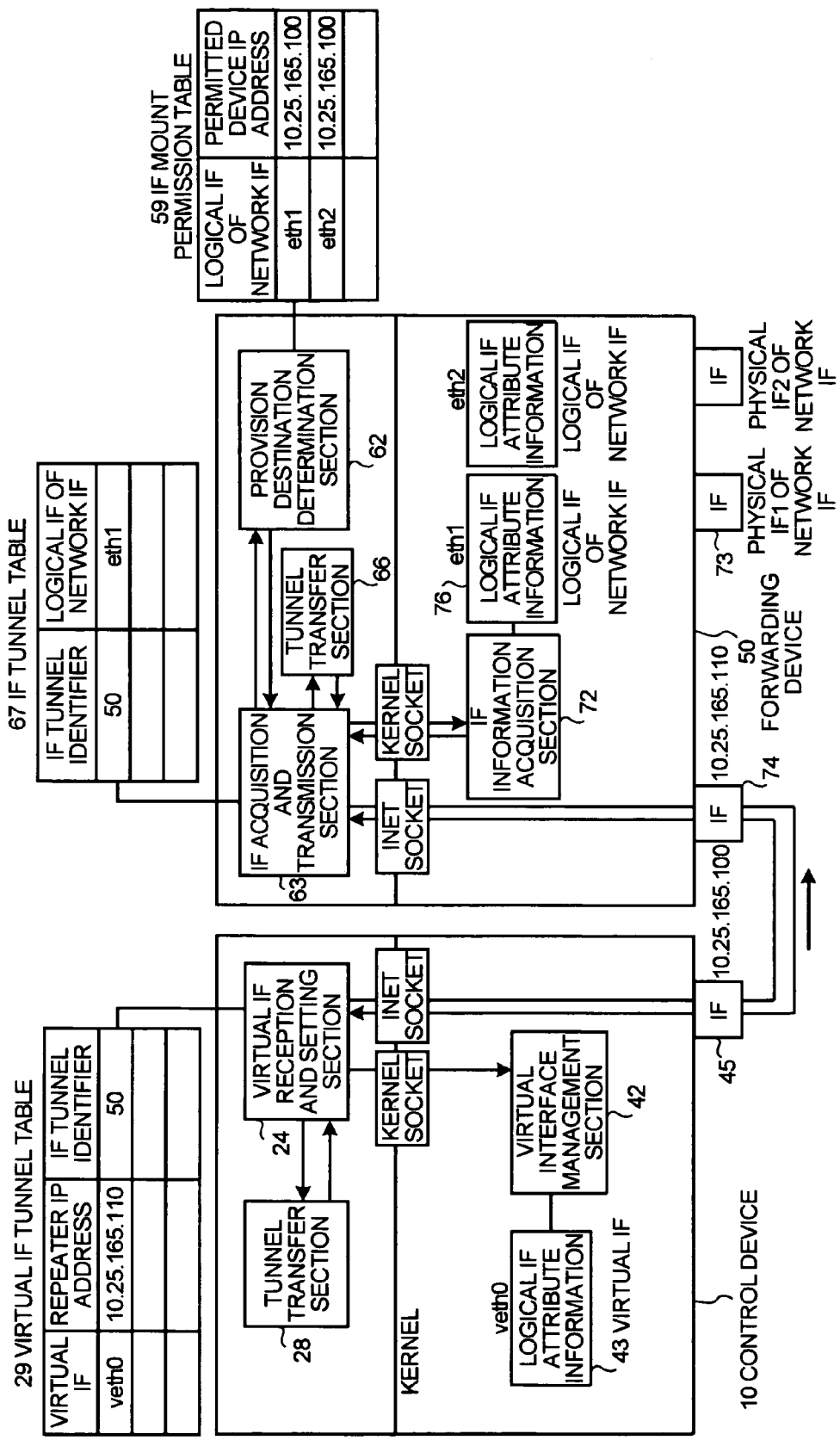
FIG. 26 illustrates one example of an internal communication path in a virtual IF setting phase of the packet processing system shown in FIG. 24.

One example of the internal communication path in the virtual IF setting phase of the packet processing system will be explained in detail. FIG. 26 illustrates one example of the internal communication path in the virtual IF setting phase of the packet processing system shown in FIG. 24. As shown in FIG. 26, in the virtual IF setting phase, the virtual IF reception and setting section 24 and the IF acquisition and transmission section 63 connect the logical network IF 76 on the forwarding device 50 to the virtual IF 43 on the control device 10 by the internal communication path, thereby setting the virtual IF 43.

The virtual IF reception and setting section 24 and the IF acquisition and transmission section 63 notify the tunnel transfer sections 28 and 66 each of which manages the virtual IF tunnel table 29 and the IF tunnel table 67, respectively. It is noted that the virtual IF tunnel table 29 and the IF tunnel table 67 are generated in the next internal communication path generation phase. The IF mount permission table 59 is a table set by the user in advance.

If the virtual IF setting phase is over, the IF tunnel table generation section 64 of the forwarding device 50 transmits the tunnel identifier of the tunnel for transferring the data packet from the control device 10 to the forwarding device 50 to the virtual IF tunnel table generation section 25 of the control device 10, and generates the IF tunnel table 67 (at step S215). The virtual IF table generation section 25 of the control device 10 generates the virtual IF tunnel table 29 based on the tunnel identifier received from the IF tunnel table generation section 64 of the forwarding device 50 (at step S216).

Further, if the virtual IF reception and setting section 24 sets the virtual IF 43, the virtual IF reception and setting section 24 notifies the tunnel transfer section 28 of the setting of the virtual IF 43 (at step S217). The tunnel transfer section 28 which is notified by the virtual IF reception and setting section 24 generates part of the internal communication path (the tunnel transfer section 28 ↔–the inter-device communication physical IF 45, and the tunnel transfer section 28

↔ the virtual IF 43) and is connected to the tunnel transfer section 66 of the forwarding device 50 (at steps S218 to S219).

The virtual IF socket table generation section 27 sets the internal communication path (the virtual IF socket table generation section 27 ↔ the inter-device communication IF 45) and starts communicating with the IF socket table generation section 65 of the forwarding device 50 (at steps S220 to S221). Simultaneously with the activation of the path control section 22, the internal communication path (the path control section 22 ↔ the destination determination section 43) is generated (at step S222). Further, when the path control section 22 opens the socket toward the virtual IF 43, the destination determination section 41 notifies the virtual IF socket table generation section 27 of the opening of the socket (at step S223).

The virtual IF socket table generation section 27 transmits both the tunnel identifier of the tunnel for transferring the data packet from the forwarding device 10 to the control device 10 and a socket address of the path control section 22 to the IF socket table generation section 65 and generates the virtual IF socket table 30 (at steps S224 to S225). At the same time, the IF socket table generation section 65 generates the IF socket table 68 (at step S226).

Figure 27:
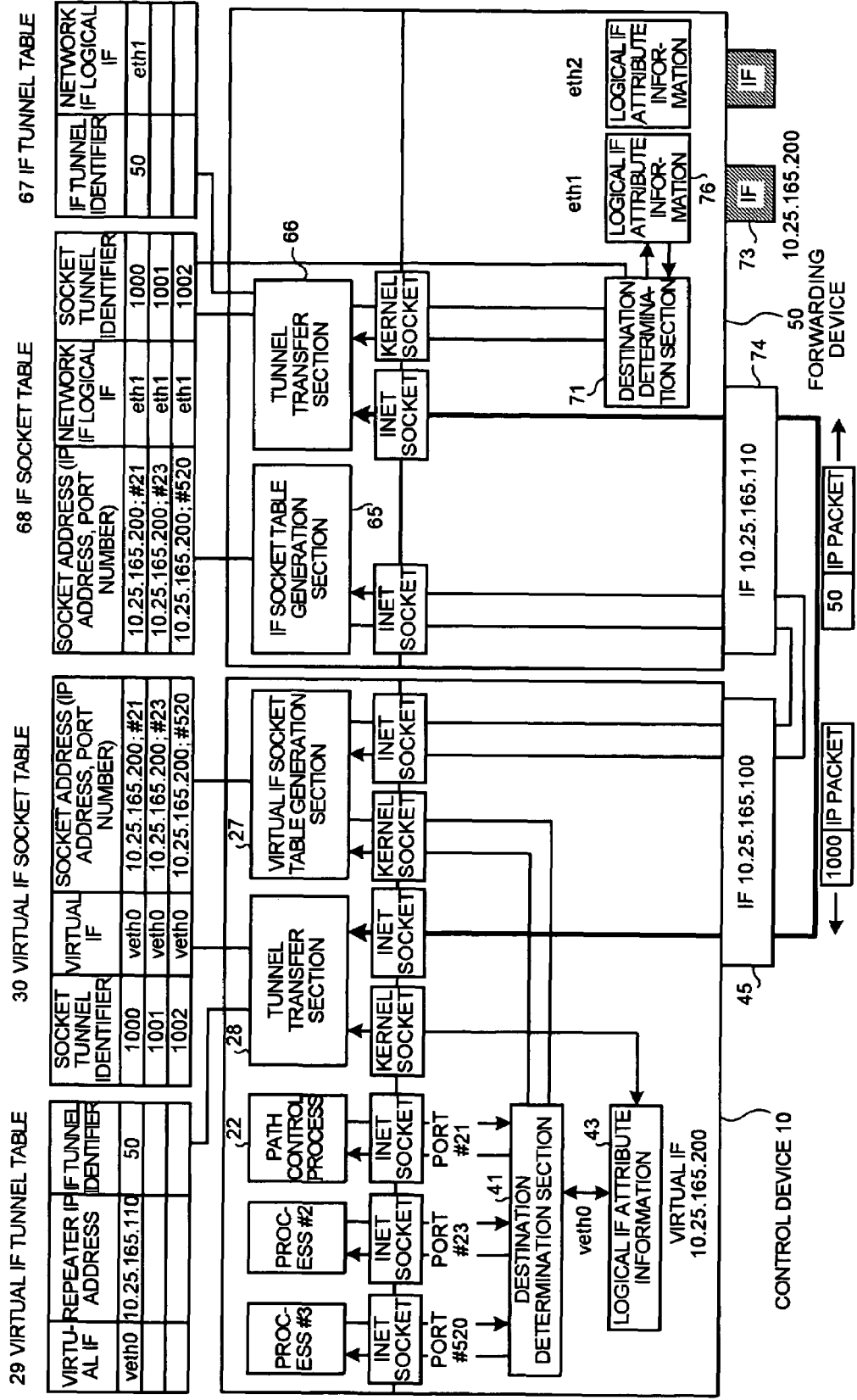
FIG. 27 illustrates one example of the internal communication path in a tunnel generation phase of the packet processing system shown in FIG. 24.

One example of the internal communication path in the tunnel generation phase of the packet processing system will be explained in detail. FIG. 27 illustrates one example of the internal communication path in the tunnel generation phase of the packet processing system shown in FIG. 24. As shown in FIG. 27, the tunnel transfer sections 28 and 66 connect the logical network IF 76 on the forwarding device 50 to the virtual IF 43 on the control device 10 by the internal communication path, and extends the communication between the process and the virtual IF 43 on the control device 10 to the logical network IF 76 on the forwarding device 50. It is thereby possible to communicate with the network node 90 on the network. The virtual IF socket table 30 and the IF socket table 68 are tables for defining the internal communication path through which the data packet is transferred from the forwarding device 50 to the control device 10. The tables 30 and 68 are generated by the virtual IF socket table generation section 27 and the IF socket table generation section 65, respectively.

Figure 28:
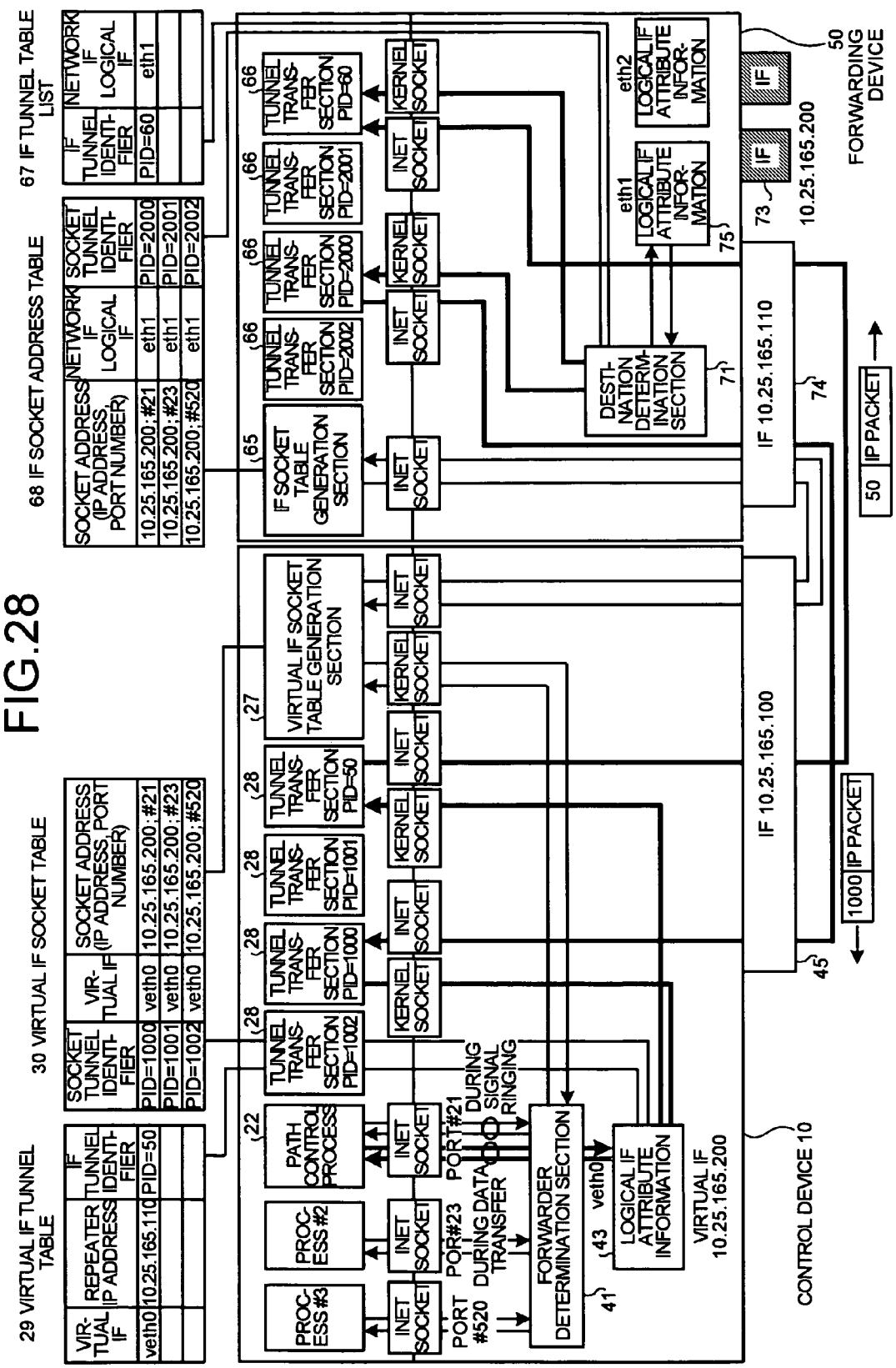
FIG. 28 illustrates another example of the internal communication path in the tunnel generation phase of the packet processing system shown in FIG. 24.

FIG. 28 illustrates another example of the internal communication path in the tunnel generation phase of the packet processing system shown in FIG. 24. As shown in FIG. 28, a tunnel is generated for a plurality of processes on the control device; however, the procedures for generating the internal communication path are the same as those explained above.

As can be seen, in the control device 10, the forwarder determination section 41 is notified when the process starts communication with the virtual IF 43 and notifies the virtual IF socket table generation section 27 to generate an internal communication path between control device 10 and forwarding device 50. The virtual IF socket table generation section 27 is notified by the forwarder determination section 41, transmits the socket address and the tunnel identifier of the process to the forwarding device 50, and generates the virtual IF socket table 30 for making the tunnel identifier, the virtual IF 43, and the socket address associate with one another. The forwarding device 50 generates the IF socket table 68 for making the socket address of the process transmitted from the virtual IF socket table generation section 27 of the control device 10, the tunnel identifier, and the logical network IF 76 associate with one another. Therefore, it is possible to provide the packet processing system which generates the internal communication path between the virtual IF 43 of the control device 10 and the logical network IF 76 of the forwarding device 50 and which is compatible with at least conventionally used path control protocol software.

Figure 29:
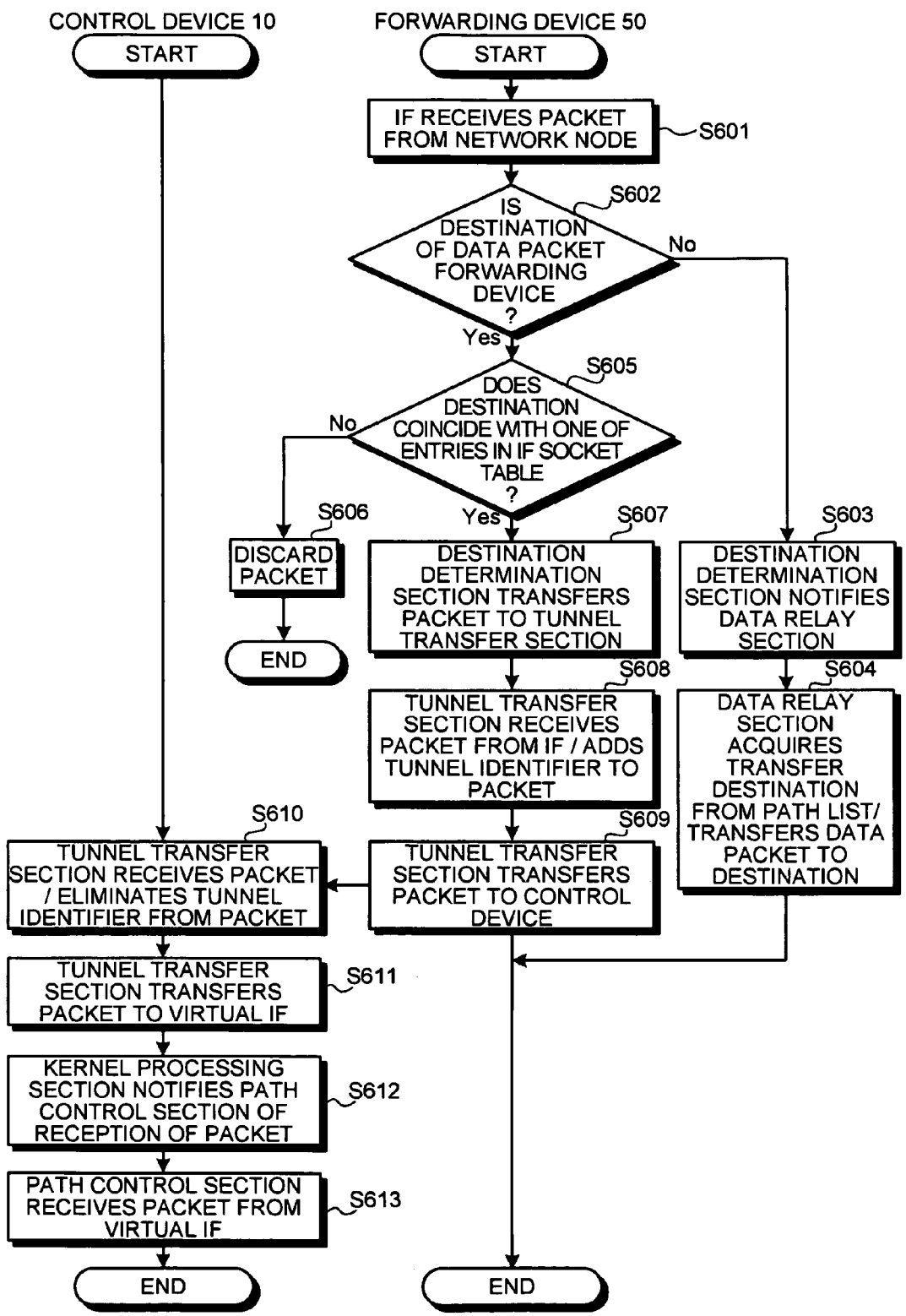
FIG. 29 is a flow chart which illustrates received packet transfer procedures in the packet processing system shown in FIG. 24.

Received packet transfer procedures in the packet processing system shown in FIG. 24 will be explained. FIG. 29 is a flow chart which illustrates the received packet transfer procedures in the packet processing system shown in FIG. 24.

As shown in FIG. 29, when receiving the data packet from the network node 90 on the network 80 at the physical network IF 73 of the forwarding device 50 (at step S601), the destination determination section 71 determines the destination from the header of the data packet and whether the data packet is a data packet to be received by the forwarding device 50 (at step S602). If the destination of the data packet is not the forwarding device 50 ("NO" at step S602), the destination determination section 71 notifies the data relay section 60 of the determination result and the data relay section 60 acquires a data packet transfer destination from the path table 69 and transfers the data packet to the transfer destination (at steps S603 to S604).

If the destination of the data packet is the forwarding device 50 ("YES" at step S602), the destination determination section 71 refers to the IF socket table 68 and determines whether the destination coincides with one of entries in the IF socket table 68 (at step S605). If the destination does not coincide with any entry in the IF socket table 68 (or, in this embodiment, if the destination does not coincide with the port number of the socket opened by the path control section 22) ("NO" at step S605), the destination determination section 71 discards the data packet (at step S606). If the destination coincides with any one of the entries in the IF socket table 68 ("YES" at step S605), the destination determination section 71 notifies the tunnel transfer section 66 of the reception of the data packet (at step S607).

The tunnel transfer section 66 receives the data packet from the logical network IF 76, adds the tunnel identifier to the data packet based on the IF socket table 68, and thereby encapsulates the data packet (at step S608). Further, the tunnel transfer section 66 transfers this data packet to the tunnel transfer section 28 of the control device 10 (at step S609).

After receiving the data packet, the tunnel transfer section 28 eliminates the tunnel identifier from the data packet (at step S610) and transfers the data packet to the virtual IF 43 based on the tunnel identifier and the virtual IF socket table 30 (at step S611). If the virtual IF 43 receives the data packet, the kernel processing section 40 reads the port number from the header of the data packet and notifies the path control section 22 of the arrival of the data packet (at step S612). The path control section 22 receives the data packet from the virtual IF 43 (at step S613).

As can be seen, the forwarding device 50 encapsulates the data packet received from the logical network IF 76 based on the IF socket table 68 and transmits the encapsulated data packet to the control device 10. In the control device 10, the tunnel transfer section 28 decapsulates the data packet received from the forwarding device 50 based on the virtual IF socket table 30 and transfers the decapsulated data packet to the virtual IF 43. Therefore, it is possible to provide the packet processing system that generates the internal communication path between the virtual IF 43 on the control device 10 and the logical network IF 76 on the forwarding device 50 and that is compatible with at least conventionally used path control protocol software.

Figure 30:
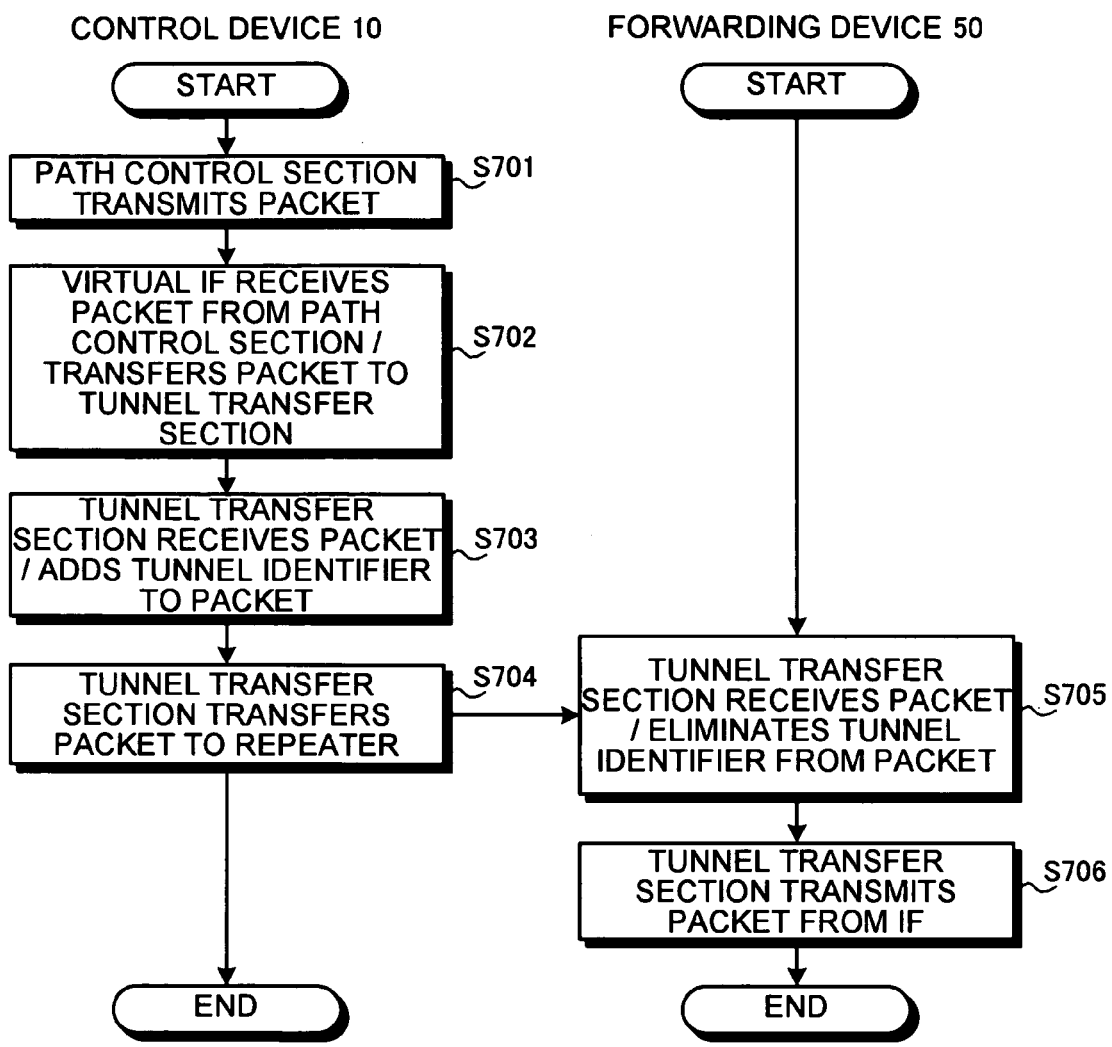
FIG. 30 is a flow chart which illustrates transmitted packet transfer procedures in the packet processing system shown in FIG. 24.

Data packet transfer procedures of the packet processing system shown in FIG. 24 will be explained. FIG. 30 is a flow chart which illustrates the data packet transfer procedures of the packet processing system shown in FIG. 24.

As shown in FIG. 30, when the path control section 22 transmits the data packet to the virtual IF 43 (at step S701), the virtual IF 43 receives the data packet and transfers the data packet to the tunnel transfer section 28 (at step S702).

The tunnel transfer section 28 adds the tunnel identifier to the data packet based on the virtual IF tunnel table 29 and thereby encapsulates the data packet (at step S703). The tunnel transfer section 28 transfers the encapsulated data packet to the tunnel transfer section 66 of the forwarding device 50 (at step S704). The tunnel transfer section 66 of the forwarding device 50 refers to the IF tunnel table 67, receives the data packet, and eliminates the tunnel identifier from the data packet (at step S705). The tunnel transfer section 66 also transmits the data packet from the physical network IF 73 corresponding to the tunnel identifier (at step S706).

As can be seen, in the control device 10, the tunnel transfer section 28 encapsulates the data packet received from the virtual IF 43 based on the virtual IF tunnel table 29 and transmits the encapsulated data packet to the forwarding device 50. In the forwarding device 50, the tunnel transfer section 66 decapsulates the data packet received from the control device 10 and transfers the decapsulated data packet to the logical network IF 76. Therefore, it is possible to provide the packet processing system that generates the internal communication path between the virtual IF 43 on the control device 10 and the logical network IF 76 on the forwarding device 50 and that is compatible with at least conventionally used path control protocol software.

In the third embodiment, the procedures for generating the internal communication path if the packet processing system according to the present invention starts communication have been explained. However, the present invention is not limited to this embodiment but can be also applied to procedures for deleting the internal communication path if the system finishes the communication. In a fourth embodiment, therefore, procedures for deleting the internal communication path if the packet processing system according to the present invention finishes the communication will be explained. The same sections as those in the third embodiment will not be explained herein.

Figure 31:
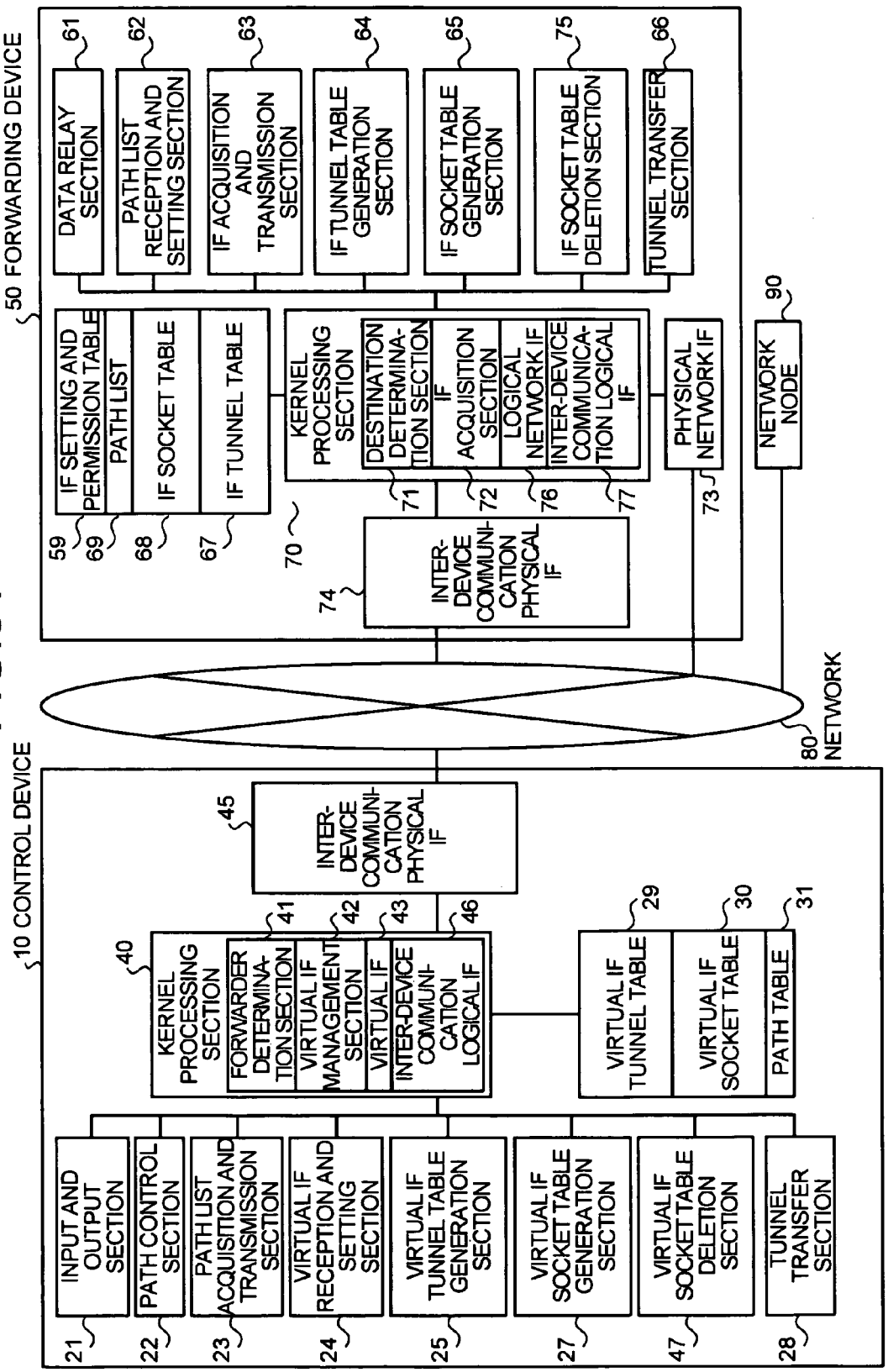
FIG. 31 is a functional block diagram which illustrates the configuration of a packet processing system in the fourth embodiment of the present invention.

FIG. 31 is a functional block diagram which illustrates a configuration of the packet processing system in the fourth embodiment. As shown in FIG. 31, the following processing sections necessary to delete the internal communication path if the processing of the control device is finished are added to the functional block diagram shown in FIG. 24 which illustrates the third embodiment.

A virtual IF socket table deletion section 47 of the control device 10 is a processing section that deletes a relevant portion from the virtual IF socket table 30 if the path control section 22 finishes communication and deletes the socket and the forwarder determination section 41 requests the deletion section 47 to delete the relevant portion from the virtual IF socket table 30. An IF socket table deletion section 75 of the forwarding device 50 is a processing section that deletes a relevant portion from the IF socket table 68 if the virtual IF socket table deletion section 47 requests the deletion section 75 to delete the relevant portion from the IF socket table 68. It is assumed herein that the virtual IF socket table deletion section 47 and the IF socket table deletion section 75 are connected to each other in advance by exactly the same method as that by which the virtual IF socket table generation section 27 and the IF socket table generation section 65 generate the internal communication path.

Figure 32:
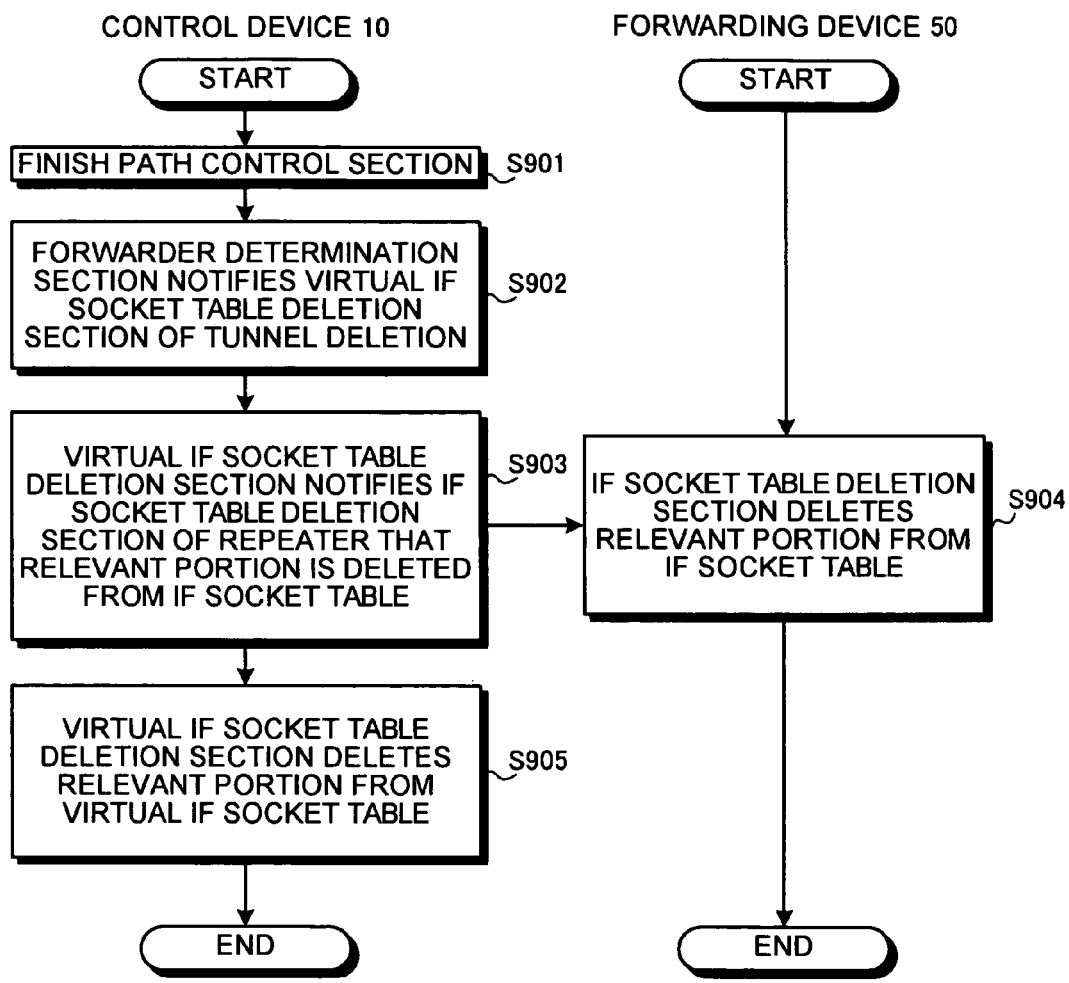
FIG. 32 is a flow chart which illustrates processing procedures for internal communication path deletion in the packet processing system shown in FIG. 31.

Processing procedures for deleting the internal communication path in the packet processing system will be explained. FIG. 32 is a flow chart which illustrates the processing procedures for deleting the internal communication path in the packet processing system shown in FIG. 24. As shown in FIG. 32, the path control section 22 of the control device 10 finishes the communication first and closes the opened socket (at step S901). The forwarder determination section 41 is notified that the path control section 22 has closed the socket and requests the virtual IF socket table deletion section 47 to delete a relevant tunnel from the virtual IF socket table 30 (at step S902). If being notified from the forwarder determination section 41, the virtual IF socket table deletion section 47 further requests the IF socket table deletion section 75 of the forwarding device 50 to delete a relevant portion from the IF socket table 68 (at step S903).

The IF socket table deletion section 75 deletes the relevant portion from the IF socket table 68 (at step S904). The virtual IF socket table deletion section 47 deletes the relevant portion from the virtual IF socket table 30 (at step S905).

As can be seen, in the control device 10, if the process is finished, then the forwarder determination section 41 detects the path control section 22 has closed the socket, the virtual IF socket table deletion section 47 requests the forwarding device 50 to delete the relevant portion from the IF socket table 65 and deletes the relevant portion from the virtual IF socket table 30. In the forwarding device 50, the IF socket table deletion section 75 deletes the relevant portion from the IF socket table 65 as requested by the control device 10. Therefore, it is possible to provide the packet processing system which always updates the internal communication path between the virtual IF 43 on the control device 10 and the logical network IF 76 on the forwarding device 50 and which is compatible with at least the conventionally used path control protocol software.

The packet processing system and the packet processing methods explained in the first to the fourth embodiments can be realized by allowing a computer system such as a personal computer or a workstation to execute a program prepared in advance. In a fifth embodiment, therefore, the computer system for executing a packet processing program that has the same functions as that of the packet processing system (or the packet processing method) explained in the first to the fourth embodiments will be explained.

Figure 33:
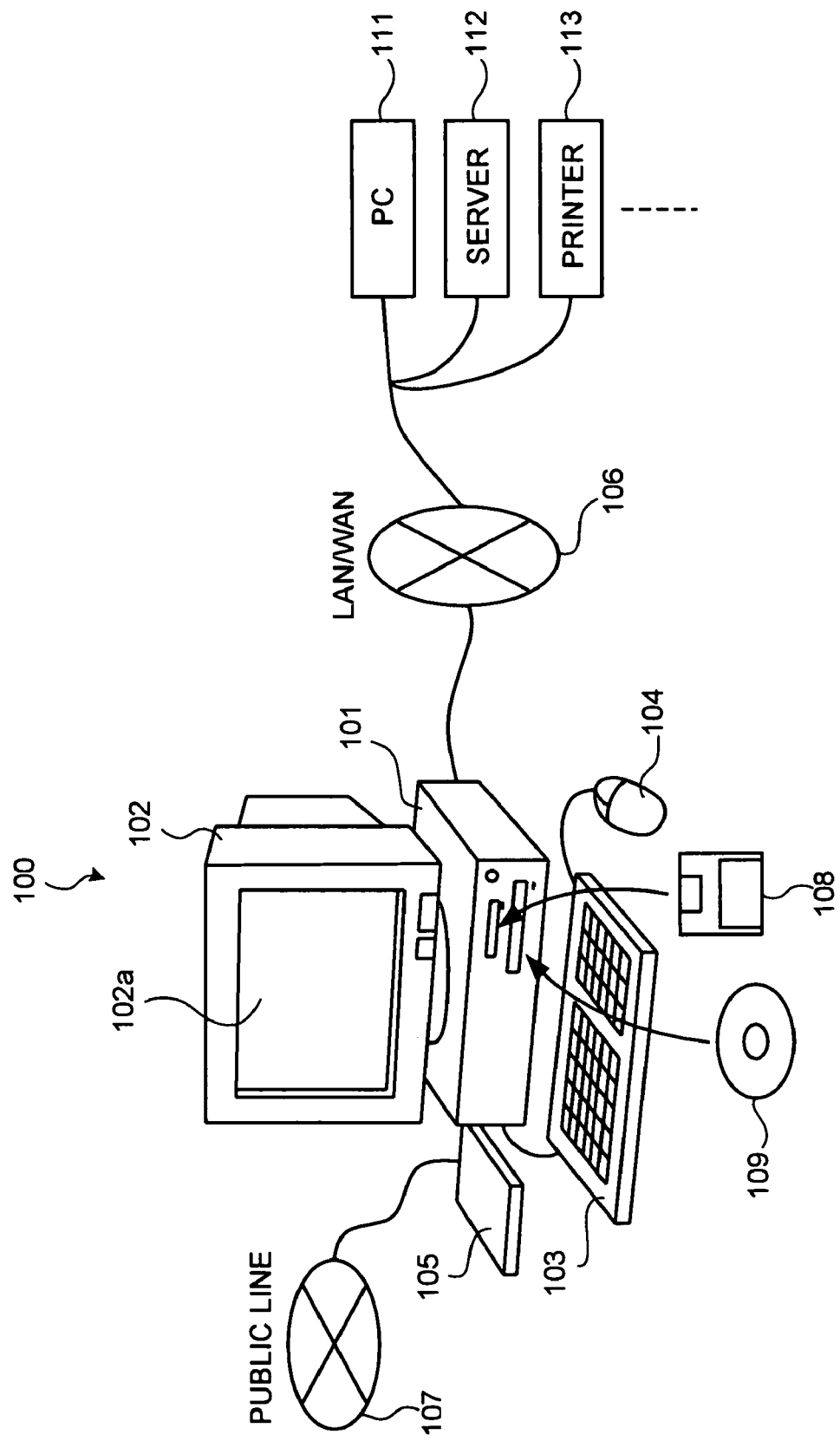
FIG. 33 is a system block diagram which illustrates the configuration of a computer system in the fifth embodiment of the present invention.
Figure 34:
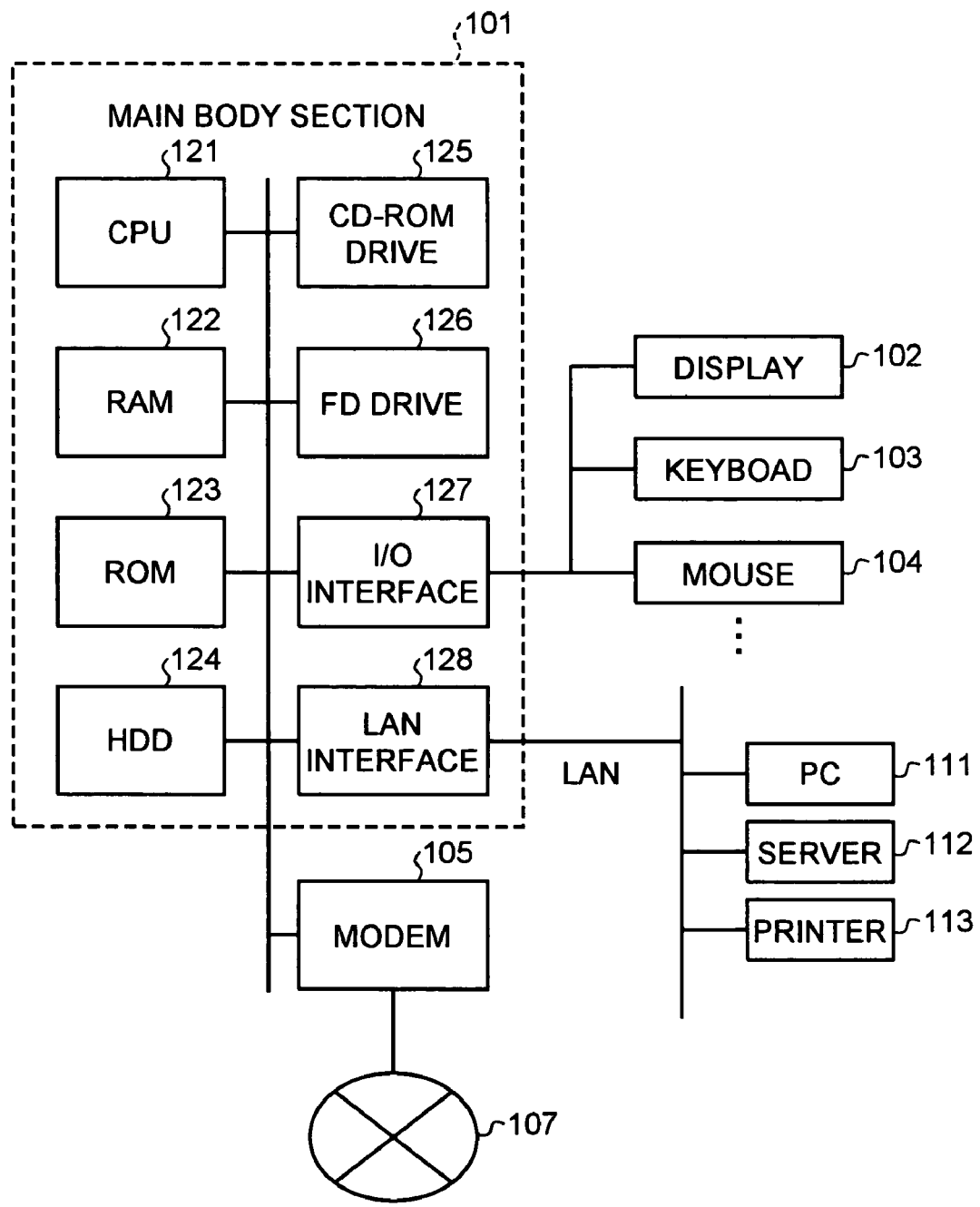
FIG. 34 is a block diagram which illustrates the configuration of a main body section in the computer system shown in FIG. 33.

FIG. 33 is a system block diagram which illustrates the configuration of the computer system in the fifth embodiment. FIG. 34 is a block diagram which illustrates the configuration of a main body section of this computer system. As shown in FIG. 33, a computer system 100 in the fifth embodiment includes a main body section 101, a display 102 which displays information such as an image on a display screen 102a in response to a command from the main body section 101, a keyboard 103 for inputting various pieces of information to the computer system 100, and a mouse 104 for designating an arbitrary position on the display screen 102a of the display 102.

As shown in FIG. 34, the main body section 101 of the computer system 100 includes a CPU 121, a RAM 122, a ROM 123, a hard disk drive (hereinafter "HDD") 124, a CD-ROM drive 125 which receives a CD-ROM 109, an FD drive 126 which receives a flexible disk (hereinafter "FD") 108, an I/O interface 127 to which the display 102, the keyboard 103, and the mouse 104 are connected, and a LAN interface 128 connected to a local area network or a wide area network (hereinafter "LAN/WAN") 106.

A modem 105 for connecting the computer system 100 to a public line 107 such as the Internet is connected to this computer system 100. In addition, the other computer system (hereinafter "PC") 111, a forwarding device 112, a printer 113, and the like are connected to the computer system 100, via the LAN interface 128 and the LAN/WAN 106.

This computer system 100 realizes the packet processing system (or the packet processing method) by reading and executing a packet processing program recorded on a predetermined recording medium. Examples of the predetermined recording medium include any types of recording mediums that record the packet processing program readable by the computer system, for example, "portable physical mediums" such as the FD 108, the CD-ROM 109, an MO disk, a DVD disk, a magneto-optical disk, and an IC card, "fixed physical mediums" such as the HDD 124, the RAM 122, and the ROM 123 provided inside or outside of the computer system 100, and "communication mediums" such as the public line 107 connected to the computer system 100 through the modem 105 and the LAN/WAN 106 to which the other computer system 111 and the forwarding device 112 are connected, which hold the program for a short period of time if the program is transmitted.

Namely, the packet processing program is recorded on the recording medium such as the "portable physical medium", "fixed physical medium" or "communication medium" in a computer readable manner. The computer system 100 reads and executes the packet processing program from such a recording medium and thereby realizes the packet processing system or the packet processing method. The packet processing program is not limited to the program executed by the computer system 100. The present invention can be similarly applied to an instance in which the packet processing program is executed by the other computer system 111, the forwarding device 112, or a combination thereof.

The embodiments of the present invention have been explained so far. However, the present invention can be carried out by various other embodiments besides the embodiments explained so far, within the scope of the technical concept defined by appended claims.

For example, in the third and the fourth embodiments, the present invention has been explained while referring to the examples in which the forwarding device 50 and the network node 90 are connected to the same network. However, the present invention is not limited to the examples but can be also applied to an example in which the forwarding device 50 and the network node 90 are connected to different networks, respectively.

In the third and the fourth embodiments, the present invention has been explained while referring to the examples in which the virtual IF serves as the symbol section. However, the present invention is not limited to the examples but can be also applied to an example in which a file, for example, serves as the symbol section. Specifically, the IF of the forwarding device is made to associate with a file in a specific directory on the control device, a process on the control device opens this file and reads and writes data from and to the file, whereby the data can be transmitted and received through a remote IF.

In the third and the fourth embodiments, the present invention has been explained while referring to the examples in which a plurality of processes on the control device communicate with one of the logical network IF on the forwarding device. However, the present invention is not limited to the examples but can be also applied to an example in which a plurality of processes communicate with a plurality of logical network IFs, respectively.

In the third and the fourth embodiments, the present invention has been explained while referring to the examples in which one control device is connected to one forwarding device, the communication between the process and the virtual IF on the control device is extended to the communication with the IF on the forwarding device. However, the present invention is not limited to the examples but can be also applied to an example in which a plurality of control devices are connected to a plurality of forwarding devices, respectively.

Among the processings explained so far in the embodiments, all of or part of the processings which have been explained that they are carried out automatically can be carried out manually or all of or part of those which have been explained that they are carried out manually can be carried out automatically by a well-known method. Further, the processing procedures, the control procedures, the specific names, and the information including various pieces of data and parameters explained in the specification and shown in the drawings can be arbitrarily changed unless specified otherwise.

Moreover, the respective constituent elements of the control device and the forwarding device shown in the drawings are functionally conceptual and are not necessarily physically constituted as shown in the drawings. Namely, the concrete manners of distribution and integration of the control device and the forwarding device are not limited to those shown in the drawings but all of or part of the constituent elements can be distributed and integrated functionally or physically in arbitrary units. Furthermore, all of or part of the respective processing functions carried out by the control device and the forwarding device can be realized by the CPU and a program analyzed and executed by the CPU or realized as wired logical hardware.

As explained so far, according to the first aspect of the present invention, the packet processing system is constituted so that the control device comprises a symbol section set to associate with address information on the forwarding device, requests the forwarding device to set the packet transfer rule for transferring the packet received using the network interface to the control device, and sets the packet transfer rule for transferring the packet from the forwarding device to the control device while making the packet associate with the symbol section if it is detected that the application accesses the symbol section, and so that the forwarding device sets the packet transfer rule requested by the transfer control unit of the control device. Therefore, if a new application is started on the control device, the control device can dynamically set the packet transfer rule between the control device and the forwarding device, thereby making it possible to separate and integrate the forwarding device and the control device without modifying a conventionally used application.

According to the second aspect of the present invention, the packet processing system is constituted so that the control device requests the forwarding device to delete the packet transfer rule for transferring the packet received to the control device and deletes the packet transfer rule for receiving the packet from the forwarding device while making the packet associate with the symbol section, and the forwarding device is constituted to delete the packet transfer rule requested by the transfer control unit of the control device if it is detected that the application closes a communication port for access to the symbol section. Therefore, if the application is stopped on the control device, the control device can dynamically delete the packet transfer rule between the control device and the forwarding device, thereby making it possible to separate and integrate the forwarding device and the control device without modifying a conventionally used application.

According to the third aspect of the present invention, the packet processing system is constituted so that the symbol section is a virtual interface corresponding to the network interface. Therefore, by using the virtual interface corresponding to the network interface, an operation environment equivalent to an operation environment of the conventionally used application can be provided. It is thereby possible to separate and integrate the forwarding device and the control device without modifying a conventionally used application.

According to the fourth aspect of the present invention, the packet processing system is constituted so that the packet transfer rule is a rule for encapsulating the packet so as to include a tunnel identifier and transferring the encapsulated packet between the control device and the forwarding device. Therefore, it is possible to ensure transferring the packet to the destination.

According to the fifth aspect of the present invention, the packet processing system is constituted so that the tunnel identifier consists of an up tunnel identifier corresponding to the network interface at which the packet is received, a virtual interface corresponding to the network interface, an address of the control device, and a protocol address of the application of the control device; and a down tunnel identifier corresponding to a transmission virtual interface for transmitting the packet, an address of the forwarding device, and the network interface corresponding to the transmission virtual interface. Therefore, it is possible to ensure transferring the packet in both up and down directions to the destination.

According to the sixth aspect of the present invention, the packet processing system is constituted so that the symbol section is a virtual IP address corresponding to an IP address held by the forwarding device. Therefore, by using the virtual IP address, an operation environment equivalent to an operation environment of a conventionally used application can be provided. It is thereby possible to separate and integrate the forwarding device and the control device without modifying a conventionally used application.

According to the seventh aspect of the present invention, the packet processing system is constituted so that the packet transfer rule is a rule for conducting address conversion for converting an address of the packet and transferring the packet between the control device and the forwarding device. Therefore, it is possible to ensure transferring the packet to the destination.

According to the eighth aspect of the present invention, the packet processing system is constituted so that the address conversion consists of: up address conversion, conducted in the forwarding device, for converting a destination address of the packet from the virtual IP packet to an address of the control device, transferring the packet to the control device, and converting the destination address from the address of the control device to the virtual IP address; and down address conversion, conducted in the control device, for converting a sender address of the packet from the virtual IP address to the address of the control device, transferring the packet to the forwarding device, and converting the sender address of the packet from the address of the control device to the virtual IP address in the forwarding device. Therefore, it is possible to ensure transferring the packet in both direction of up and down directions to the destination.

According to the ninth aspect of the present invention, the packet processing system is constituted so that the application is a path control process of a router. Therefore, it is possible to separate and integrate the forwarding device and the control device without modifying a conventionally used application.

According to the tenth aspect of the present invention, the packet processing system is constituted so that the control device and the forwarding device are connected to each other on a network on a data link layer, and exchange control message between them using a data link layer protocol. Therefore, even if attribute information on a higher layer related to the interface used for the communication between the control device and the forwarding device is changed, the communication can be held without intermission.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A packet processing system comprising:
 a forwarding device that transmits and receives a packet through a network interface; and
 a control device that transfers the packet between the control device and the forwarding device, and responds to the packet using an application, wherein
 the control device includes
  a symbol section that is associated with address information of the forwarding device; and
  a first transfer control section that when detecting that the application accesses the symbol section, sets a packet transfer rule in the forwarding device by transmitting to the forwarding device a setting request that the forwarding device sets the packet transfer rule that is used to transfer the received packet to the control device, and the forwarding device includes
  a second transfer control section that sets the packet transfer rule in response to the setting request, wherein
 the symbol section is a virtual interface corresponding to the network interface,
 the first transfer control section, when detecting that application closes a communication port for access to the symbol section, cancels the packet transfer rule in the forwarding device by transmitting to the forwarding device a cancel request that the forwarding device cancels the packet transfer rule, and the second transfer control unit cancels the packet transfer rule in response to the cancel request.

2. A packet processing system comprising:
 a forwarding device that transmits and receives a packet through a network interface: and
 a control device that transfers the packet between the control device and the forwarding device, and responds to the packet using an application, wherein
 the control device includes
  a symbol section that is associated with address information of the forwarding device; and
  a first transfer control section that when detecting that the application accesses the symbol section, sets a packet transfer rule in the forwarding device by transmitting to the forwarding device a setting request that the forwarding device sets the packet transfer rule that is used to transfer the received packet to the control device, and the forwarding device includes
  a second transfer control section that sets the packet transfer rule in response to the setting request, wherein
 the symbol section is a virtual interface corresponding to the network interface, and
 the forwarding device further includes an interface determination section that when receiving from the control device an interface request that the forwarding device provides the network interface to the control device, determines whether the network interface is available.

3. A packet processing system comprising:
a forwarding device that transmits and receives a packet through a network interface: and
a control device that transfers the packet between the control device and the forwarding device, and responds to the packet using an application, wherein
the control device includes
a symbol section that is associated with address information of the forwarding device; and
a first transfer control section that when detecting that the application accesses the symbol section, sets a packet transfer rule in the forwarding device by transmitting to the forwarding device a setting request that the forwarding device sets the packet transfer rule that is used to transfer the received packet to the control device, and
the forwarding device includes
a second transfer control section that sets the packet transfer rule in response to the setting request, wherein
the symbol section is a virtual interface corresponding to the network interface, and
the packet transfer rule indicates to encapsulate the packet so as to include a tunnel identifier and to transfer the packet between the control device and the forwarding device.

4. The packet processing system according to claim 3, wherein the tunnel identifier includes
an up-tunnel identifier that is associated with the network interface, a virtual interface corresponding to the network interface, an address of the control device, and a protocol address of the application; and
a down tunnel identifier that is associated with a transmission virtual interface for transmitting the packet, an address of the forwarding device, and
a network interface corresponding to the transmission virtual interface.

5. A packet processing system comprising:
a forwarding device that transmits and receives a packet through a network interface: and
a control device that transfers the packet between the control device and the forwarding device, and responds to the packet using an application, wherein
the control device includes
a symbol section that is associated with address information of the forwarding device; and
a first transfer control section that when detecting that the application accesses the symbol section, sets a packet transfer rule in the forwarding device by transmitting to the forwarding device a setting request that the forwarding device sets the packet transfer rule that is used to transfer the received packet to the control device, and
the forwarding device includes
a second transfer control section that sets the packet transfer rule in response to the setting request, wherein
the symbol section is a virtual interface corresponding to the network interface, and
the symbol section is a virtual IP address corresponding to an IP address of the forwarding device.

6. A packet processing system comprising:
a forwarding device that transmits and receives a packet through a network interface: and
a control device that transfers the packet between the control device and the forwarding device, and responds to the packet using an application, wherein
the control device includes
a symbol section that is associated with address information of the forwarding device; and
a first transfer control section that when detecting that the application accesses the symbol section, sets a packet transfer rule in the forwarding device by transmitting to the forwarding device a setting request that the forwarding device sets the packet transfer rule that is used to transfer the received packet to the control device, and
the forwarding device includes
a second transfer control section that sets the packet transfer rule in response to the setting request, wherein
the symbol section is a virtual interface corresponding to the network interface, and
the packet transfer rule indicates to convert an address of the packet and to transfer the packet between the control device and the forwarding device.

7. A packet processing system comprising:
a forwarding device that transmits and receives a packet through a network interface: and
a control device that transfers the packet between the control device and the forwarding device, and responds to the packet using an application, wherein
the control device includes
a symbol section that is associated with address information of the forwarding device; and
a first transfer control section that when detecting that the application accesses the symbol section, sets a packet transfer rule in the forwarding device by transmitting to the forwarding device a setting request that the forwarding device sets the packet transfer rule that is used to transfer the received packet to the control device, and
the forwarding device includes
a second transfer control section that sets the packet transfer rule in response to the setting request, wherein
the symbol section is a virtual interface corresponding to the network interface.
the packet transfer rule defines up address conversion and down address conversion, the up address conversion designates that a destination address of the packet is converted in the forwarding device from a virtual IP address to an address of the control device in the forwarding device, the packet is transferred to the control device, and the destination address of the transmitted packet transmitted is converted from the address of the control device to the virtual IP address in the control device, and
the down address conversion designates that a sender address of the packet is converted from a virtual IP address to an address of the control device in the control device, the packet is transferred to the forwarding device, and the sender address of the transmitted packet is converted from the address of the control device to the virtual IP address.

8. A method of processing a packet between a forwarding device and a control device, the forwarding device transmitting and receiving the packet through a network interface, the control device responding to the packet using an application, the method comprising:
associating a symbol section with address information of the forwarding device;
transmitting from the control device to the forwarding device a setting request that the forwarding device sets a packet transfer rule that is used to transfer the packet received to the control device, when the control device detects that the application accesses the symbol section:
setting the packet transfer rule in the control device;
setting the packet transfer rule in response to the setting request in the forwarding device;
transmitting from the control device to the forwarding device a cancel request that the forwarding device cancels the packet transfer rule, when the control device detects that the application closes a communication port for access to the symbol section;
canceling the packet transfer rule in the control device; and
canceling the packet transfer rule in response to the cancel request in the forwarding device and
wherein the symbol section is a virtual interface corresponding to the network interface.

9. A method of processing a packet between a forwarding device and a control device, the forwarding device transmitting and receiving the packet through a network interface, the control device responding to the packet using an application, the method comprising:
associating a symbol section with address information of the forwarding device:
transmitting from the control device to the forwarding device a setting request that the forwarding device sets a packet transfer rule that is used to transfer the packet received to the control device, when the control device detects that the application accesses the symbol section:
setting the packet transfer rule in the control device: and
setting the packet transfer rule in response to the setting request in the forwarding device, wherein
the symbol section is a virtual interface corresponding to the network interface, and
the packet transfer rule defines to encapsulate the packet so as to include a tunnel identifier and to transfer the packet between the control device and the forwarding device.

10. A method of processing a packet between a forwarding device and a control device, the forwarding device transmitting and receiving the packet through a network interface, the control device responding to the packet using an application, the method comprising:
associating a symbol section with address information of the forwarding device;
transmitting from the control device to the forwarding device a setting request that the forwarding device sets a packet transfer rule that is used to transfer the packet received to the control device, when the control device detects that the application accesses the symbol section;
setting the packet transfer rule in the control device; and
setting the packet transfer rule in response to the setting request in the forwarding device, wherein
the symbol section is a virtual interface corresponding to the network interface, and
the symbol section is a virtual IP address corresponding to an IP address of the forwarding device.

11. A method of processing a packet between a forwarding device and a control device, the forwarding device transmitting and receiving the packet through a network interface, the control device responding to the packet using an application, the method comprising;
associating a symbol section with address information of the forwarding device:
transmitting from the control device to the forwarding device a setting request that the forwarding device sets a packet transfer rule that is used to transfer the packet received to the control device, when the control device detects that the application accesses the symbol section;
setting the packet transfer rule in the control device; and
setting the packet transfer rule in response to the setting request in the forwarding device wherein
the symbol section is a virtual interface corresponding to the network interface, and
the packet transfer rule defines to convert the address of the packet and to transfer the packet between the control device and the forwarding device.

12. A computer-readable recording medium that stores a program for processing a packet between a forwarding device and a control device, the forwarding device transmitting and receiving the packet through a network interface, a control device responding to the packet using an application, wherein the program makes a computer execute:
associating a symbol section with address information of the forwarding device;
transmitting from the control device to the forwarding device a setting request that the forwarding device sets a packet transfer rule that is used to transfer the packet received to the control device, when the control device detects that the application accesses the symbol section;
setting the packet transfer rule in the control device;
setting the packet transfer rule in response to the setting request in the forwarding device;
transmitting from the control device to the forwarding device a cancel request that the forwarding device cancels the packet transfer rule, when the control device detects that the application closes a communication port for access to the symbol section;
canceling the packet transfer rule in the control device; and
canceling the packet transfer rule in response to the cancel request in the forwarding device and
wherein the symbol section is a virtual interface corresponding to the network interface.

13. A computer-readable recording medium that stores a program for processing a packet between a forwarding device and a control device, the forwarding device transmitting and receiving the packet through a network interface, a control device responding to the packet using an application, wherein the program makes a computer execute:
associating a symbol section with address information of the forwarding device;
transmitting from the control device to the forwarding device a setting request that the forwarding device sets a packet transfer rule that is used to transfer the packet received to the control device, when the control device detects that the application accesses the symbol section;
setting the packet transfer rule in the control device; and
setting the packet transfer rule in response to the setting request in the forwarding device, wherein
the symbol section is a virtual interface corresponding to the network interface, and
the packet transfer rule defines to encapsulate the pack so as to include a tunnel identifier and to transfer the packet between the control device and the forwarding device.

14. A computer-readable recording medium that stores a program for processing a packet between a forwarding device and a control device, the forwarding device transmitting and receiving the packet through a network interface, a control device responding to the packet using an application, wherein the program makes a computer execute:
associating a symbol section with address information of the forwarding device;
transmitting from the control device to the forwarding device a setting request that the forwarding device sets a packet transfer rule that is used to transfer the packet received to the control device, when the control device detects that the application accesses the symbol section;
setting the packet transfer rule in the control device; and
setting the packet transfer rule in response to the setting request in the forwarding device, wherein
the symbol section is a virtual interface corresponding to the network interface, and
the symbol section is a virtual IP address corresponding to an IP address of the forwarding device.

15. A computer-readable recording medium that stores a program for processing a packet between a forwarding device and a control device, the forwarding device transmitting and receiving the packet through a network interface, a control device responding to the packet using an application, wherein the program makes a computer execute:
    associating a symbol section with address information of the forwarding device;
    transmitting from the control device to the forwarding device a setting request that the forwarding device sets a packet transfer rule that is used to transfer the packet received to the control device, when the control device detects that the application accesses the symbol section;
    setting the packet transfer rule in the control device; and
    setting the packet transfer rule in response to the setting request in the forwarding device, wherein
    the symbol section is a virtual interface corresponding to the network interface, and
    the packet transfer rule defines to convert the address of the packet and to transfer the packet between the control device and the forwarding device.

16. A packet processing system which performs communication with a network node through a network interface of a forwarding device, wherein
    the network interface of the forwarding device and an application on a control device are connected to each other by an internal communication path,
    the control device includes
        a symbol setting unit that sets a symbol section that communicates with the application on the control device and associates it with an interface of the forwarding device;
        a first downstream path generation unit that receives from the forwarding device a downstream internal communication path identifier of a downstream internal communication path on which data is transferred in a direction from the symbol section to the interface of the forwarding device, and that generates a first downstream path table where the downstream internal path identifier is associated with the symbol section and an address of the forwarding device;
        a first upstream path generation unit that receives a start message that the application starts communicating with the symbol section, that transmits an input-output port identifier of the process and an upstream internal communication path identifier to the forwarding device, and that generates a first upstream path table where the upstream internal path identifier is associated with the symbol section and the input-output port identifier, and
    the forwarding device includes
        a second downstream path generation unit that generates a second downstream path table where the downstream internal path identifier is associated with the interface of the forwarding device; and
        a second upstream path generation unit that generates a second upstream path table where the input-output port identifier of the process, the upstream internal communication path identifier, and the interface are associated with each other.

17. The packet processing system according to claim 16, wherein the control device further includes
    a first path delete unit that when the application is completed, transmits to the forwarding device a delete request to delete elements of the second upstream path table, and that deletes the elements of the first upstream path table, which corresponds to the completed application, and
    the forwarding device further includes
        a second path delete unit that deletes the elements of the second upstream path table in response to the delete request.

18. The packet processing system according to claim 16, wherein the forwarding device further includes an interface manage section that when receiving from the control device an interface request to provide the interface to the control device, determines whether the interface is available.

19. The packet processing system according to claim 16, wherein the control device further includes
    a first path transfer unit that encapsulates a data packet received from the symbol section based on the first downstream path table, that transmits the encapsulated data packet to the forwarding device, when receiving the encapsulated data packet from the upstream path, that decapsulates the packet based on the first upstream path table, and that transfers the data packet to the symbol section, and
    the forwarding device further includes
        a second path transfer unit that encapsulates a data packet received from the interface based on the second upstream path table, that transmits the encapsulated data packet to the control device, that decapsulates the data packet received from the control device based on the second downstream path table, and that transfers the data packet decapsulated to the interface.

20. The packet processing system according to claim 16, wherein the symbol section is a virtual interface which corresponds to an interface of the forwarding device.

21. The packet processing system according to claim 20, wherein the application of the control device is a path control process of a router.

22. The packet processing system according to claim 16, wherein the control device and the forwarding device are connected to each other through a data link layer, and exchange data there between using a data link layer protocol for exchanging the control message between the control device and the forwarding device.

23. A method of processing a packet in communication with a network node through a network interface of a forwarding device, wherein the network interface of the forwarding device and an application on a control device are connected to each other by an internal communication path, the method comprising:
    setting a symbol section that communicates with the application on the control device and associates it with an interface of the forwarding device;
    receiving from the forwarding device a downstream internal communication path identifier of a downstream internal communication path on which data is transferred in a direction from the symbol section to the interface of the forwarding device, in the control device;
    generating a first downstream path table where the downstream internal path identifier is associated with the symbol section and an address of the forwarding device;

receiving a start message that the application starts communicating with the symbol section, in the control device;

transmitting from the control device to the forwarding device an input-output port identifier of the application and an upstream internal communication path identifier;

generating a first upstream path table where the upstream internal path identifier is associated with the symbol section and the input-output port identifier;

generating a second downstream path table where the downstream internal path identifier is associated with the interface of the forwarding device; and generating a second upstream path table where the input-output port identifier of the application, the upstream internal communication path identifier, and the interface are associated with each other.

24. The method according to claim 23, further comprising:
receiving a complete message that the application is completed, in the control device;
transmitting from the control device to the forwarding device a delete request to delete elements of the second upstream path table, which corresponds to the completed application;
deleting the elements of the first upstream path table;
deleting the elements of the second upstream path table in response to the delete request.

25. The method according to claim 23, further comprising determining whether the interface is available when receiving from the control device an interface request to provide the interface to the control device.

26. The method according to claim 23, further comprising:
encapsulating a data packet received from the symbol section based on the first downstream path table;
transmitting from the control device to the forwarding device the encapsulated data packet;
decapsulating the packet based on the first upstream path table when receiving the capsulated data packet from the upstream path;
transferring the decapsulated data packet to the symbol section;
encapsulating a data packet received from the interface on the forwarding device based on the second upstream path table;
transmitting from the forwarding device to the control device the data packet encapsulated;
decapsulating the data packet received from the control device based on the second downstream path table; and
transferring the decapsulated data packet to the interface.

27. The method according to claim 23, wherein the symbol section is a virtual interface which corresponds to an interface of the forwarding device.

28. The method according to claim 27, wherein the application of the control device is a path control process of a router.

29. The method according to claim 23, wherein the control device and the forwarding device are connected to each other through a data link layer, and exchange data there between using a data link layer protocol for exchanging the control message between the control device and the forwarding device.

30. A computer-readable recording medium that stores a program for processing a packet in communication with a network node through a network interface of a forwarding device, wherein the network interface of the forwarding device and an application on a control device are connected to each other by an internal communication path, wherein the program makes a computer execute:

setting a symbol section that communicates with the application on the control device and associates it with an interface of the forwarding device;

receiving from the forwarding device a downstream internal communication path identifier of a downstream internal communication path on which data is transferred in a direction from the symbol section to the interface of the forwarding device, in the control device;

generating a first downstream path table where the downstream internal path identifier is associated with the symbol section and an address of the forwarding device;

receiving a start message that the application starts communicating with the symbol section, in the control device;

transmitting from the control device to the forwarding device an input-output port identifier of the application and an upstream internal communication path identifier;

generating a first upstream path table where the upstream internal path identifier is associated with the symbol section and the input-output port identifier;

generating a second downstream path table where the downstream internal path identifier is associated with the interface of the forwarding device; and generating a second upstream path table where the input-output port identifier of the application, the upstream internal communication path identifier, and the interface are associated with each other.

31. A computer-readable recording medium according to the claim 30, wherein the program further makes the computer execute:
receiving a complete message that the application is completed, in the control device;
transmitting from the control device to the forwarding device a delete request to delete elements of the second upstream path table, which corresponds to the completed application;
deleting the elements of the first upstream path table;
deleting the elements of the second upstream path table in response to the delete request.

32. A computer-readable recording medium according to the claim 30, wherein the program further makes the computer execute determining whether the interface is available when receiving from the control device an interface request to provide the interface to the control device.

33. A computer-readable recording medium according to the claim 30, wherein the program further makes the computer execute:
encapsulating a data packet received from the symbol section based on the first downstream path table;
transmitting from the control device to the forwarding device the encapsulated data packet;
decapsulating the packet based on the first upstream path table when receiving the capsulated data packet from the upstream path;
transferring the decapsulated data packet to the symbol section;
encapsulating a data packet received from the interface on the forwarding device based on the second upstream path table;
transmitting from the forwarding device to the control device the encapsulated data packet;

decapsulating the data packet received from the control device based on the second downstream path table; and transferring the decapsulated data packer to the interface.

34. A computer-readable recording medium according to claim 30, wherein the symbol section is a virtual interface which corresponds to an interface of the forwarding device.

35. A computer-readable recording medium according to claim 34, wherein the application of the control device is a path control process of a router.

36. A computer-readable recording medium according to claim 30, wherein the control device and the forwarding device are connected to each other through a data link layer, and exchange data there between using a data link layer protocol for exchanging the control message between the control device and the forwarding device.

* * * * *

UNITED STATES PATENT AND TRADEMARK OFFICE
CERTIFICATE OF CORRECTION

PATENT NO. : 7,593,337 B2
APPLICATION NO. : 10/769752
DATED : September 22, 2009
INVENTOR(S) : Naoki Oguchi et al.

It is certified that error appears in the above-identified patent and that said Letters Patent is hereby corrected as shown below:

Title Page, Column 2 (Other Publications), Line 1, change "Seperation" to --Separation--.

Title Page, Column 2 (Other Publications), Line 3, change "Initaive fro" to --Initiative for--.

Column 28, Line 33, after "that" insert --the--.

Column 28, Line 43, change "interface: and" to --interface; and--.

Column 29, Line 3, change "interface: and" to --interface; and--.

Column 29, Line 40, change "interface: and" to --interface; and--.

Column 29, Line 64, change "interface: and" to --interface; and--.

Column 30, Line 22, change "interface: and" to --interface; and--.

Column 30, Line 41, change "interface." to --interface,--.

Column 31, Line 3, change "section:" to --section;--.

Column 31, Line 23, change "device:" to --device;--.

Column 31, Line 28, change "section:" to --section;--.

Column 31, Line 29, change "device: and" to --device; and--.

Column 31, Line 60, change "comprising;" to --comprising:--.

Column 31, Line 62, change "device:" to --device;--.

UNITED STATES PATENT AND TRADEMARK OFFICE
CERTIFICATE OF CORRECTION

PATENT NO. : 7,593,337 B2
APPLICATION NO. : 10/769752
DATED : September 22, 2009
INVENTOR(S) : Naoki Oguchi et al.

It is certified that error appears in the above-identified patent and that said Letters Patent is hereby corrected as shown below:

Column 32, Line 3, change "device wherein" to --device, wherein--.

Signed and Sealed this

Fifteenth Day of December, 2009

David J. Kappos
*Director of the United States Patent and Trademark Office*